US008392852B2

(12) United States Patent
Tokashiki

(10) Patent No.: US 8,392,852 B2
(45) Date of Patent: Mar. 5, 2013

(54) INFORMATION PROCESSING APPARATUS

(75) Inventor: Mamoru Tokashiki, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 1837 days.

(21) Appl. No.: 10/730,138

(22) Filed: Dec. 9, 2003

(65) Prior Publication Data

US 2005/0022134 A1  Jan. 27, 2005

(30) Foreign Application Priority Data

Dec. 11, 2002 (JP) ................. 2002-359922

(51) Int. Cl.
*G06F 3/048* (2006.01)
*G06F 3/00* (2006.01)
(52) U.S. Cl. .................. 715/839; 715/740; 715/741
(58) Field of Classification Search .................. 715/839, 715/740, 741; 345/839
See application file for complete search history.

(56) References Cited

U.S. PATENT DOCUMENTS

| 6,344,861 | B1 * | 2/2002 | Naughton et al. ............ 715/769 |
| 7,231,198 | B2 * | 6/2007 | Loughran .................. 455/343.2 |
| 7,464,426 | B2 * | 12/2008 | Lee et al. ........................ 8/147 |
| 7,621,012 | B2 * | 11/2009 | Kim ................................ 8/147 |
| 7,894,849 | B2 * | 2/2011 | Kass et al. ................. 455/550.1 |
| 7,926,309 | B2 * | 4/2011 | Kim et al. ...................... 68/3 R |
| 8,116,889 | B2 * | 2/2012 | Krzyzanowski et al. ....... 700/90 |
| 8,194,681 | B2 * | 6/2012 | Kaarela et al. ............... 370/401 |
| 2002/0011923 | A1 * | 1/2002 | Cunningham et al. ... 340/310.01 |

FOREIGN PATENT DOCUMENTS

| JP | 8-305484 | 11/1996 |
| JP | 11-66351 | 3/1999 |
| JP | 2002-312612 | 10/2002 |
| JP | 2007-066472 | 3/2007 |
| WO | WO 2007/075201 | 7/2007 |

OTHER PUBLICATIONS

Korean Office Action issued in corresponding Korean Patent Application No. 10-2003-0090137 mailed Aug. 30, 2010 (with English translation).

* cited by examiner

*Primary Examiner* — David Phantana Angkool
(74) *Attorney, Agent, or Firm* — Oblon, Spivak, McClelland, Maier & Neustadt, L.L.P.

(57) ABSTRACT

An user interface for facilitating user operation. At time of an initial setup, the user selects a desired character, a room, images of items to be installed in the room, such as a television receiver set, a personal computer apparatus, etc. After selection, a user interface is formed in which images of the character and an item are incorporated into an image of the room, such as for example a living room selected by the user. The user may virtually reproduce his or her room at the user interface by imagining his or her room so as to select a room and install items. As a result, it becomes possible to provide the user with a user interface which allows an intuitive and simple operation.

18 Claims, 25 Drawing Sheets

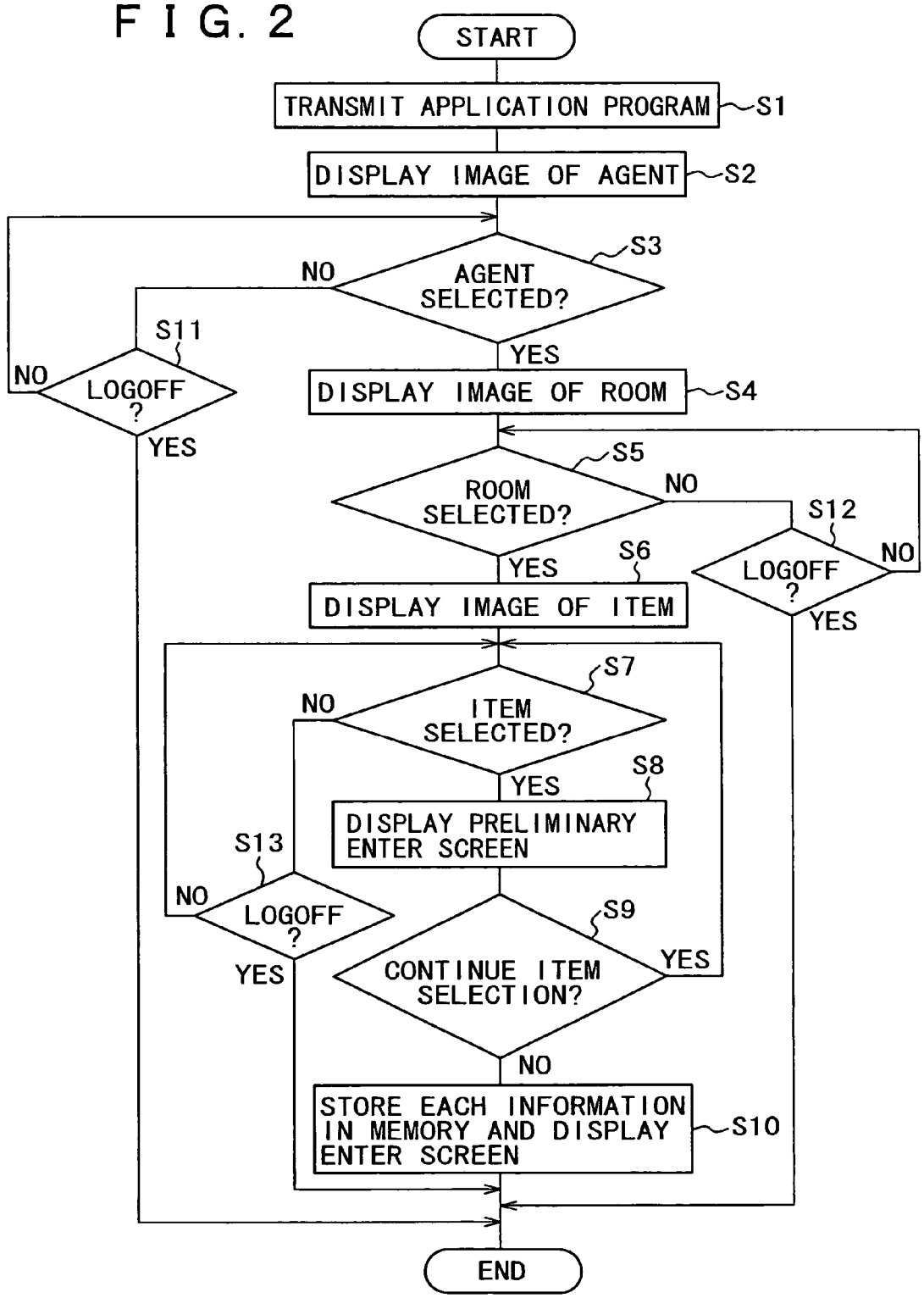

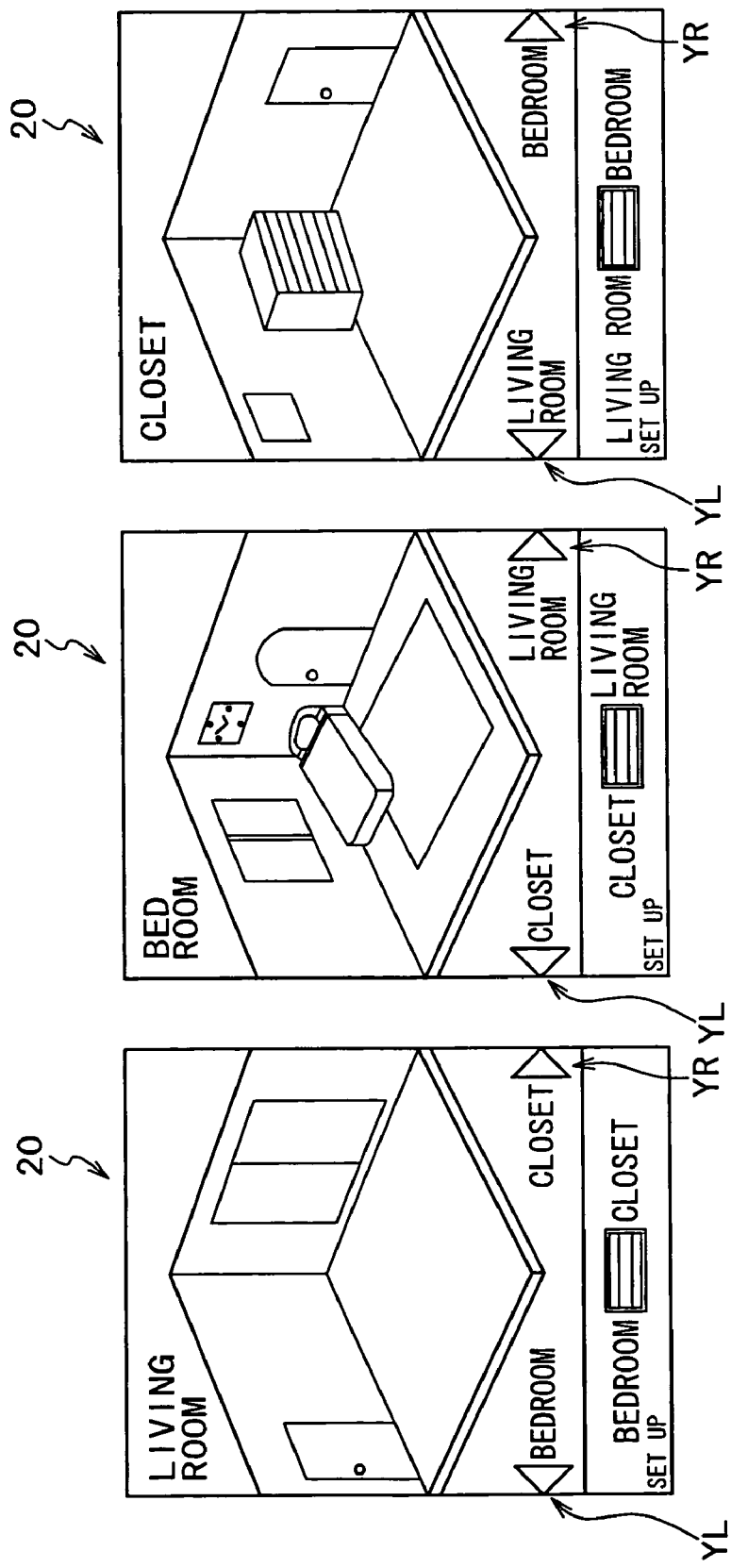

F I G. 6
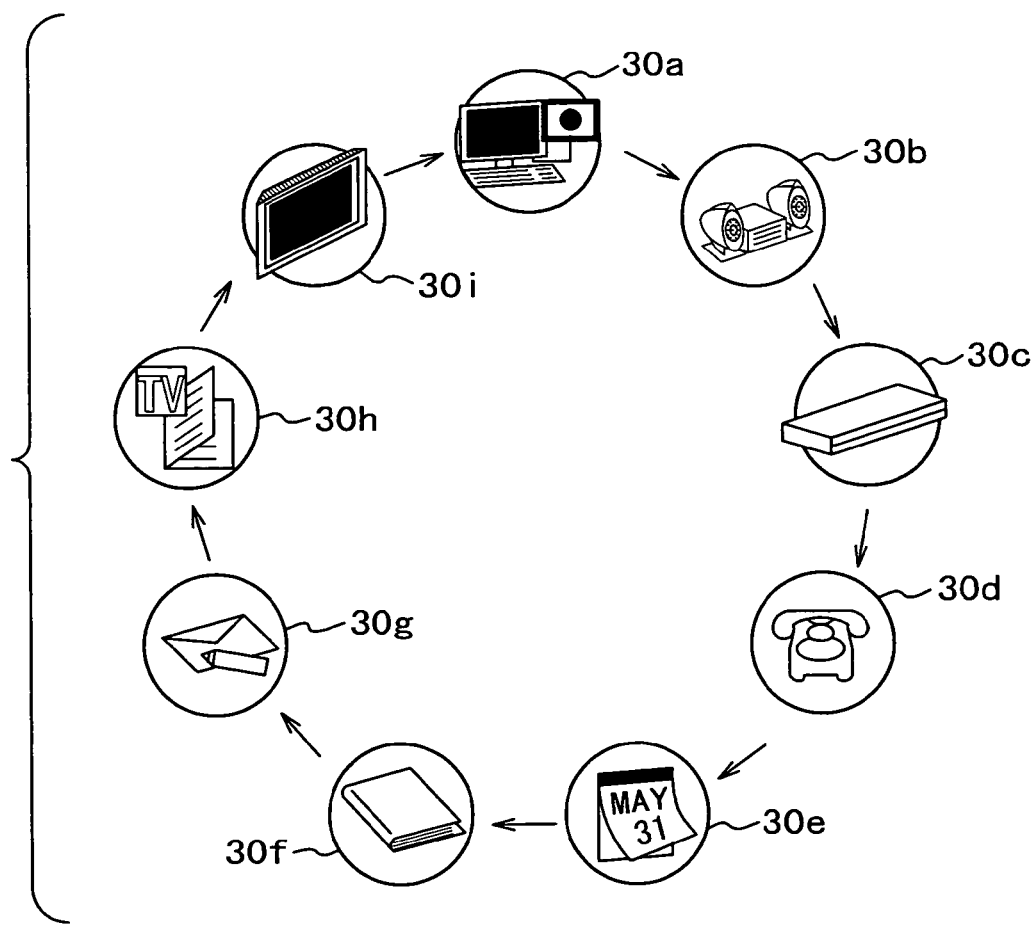

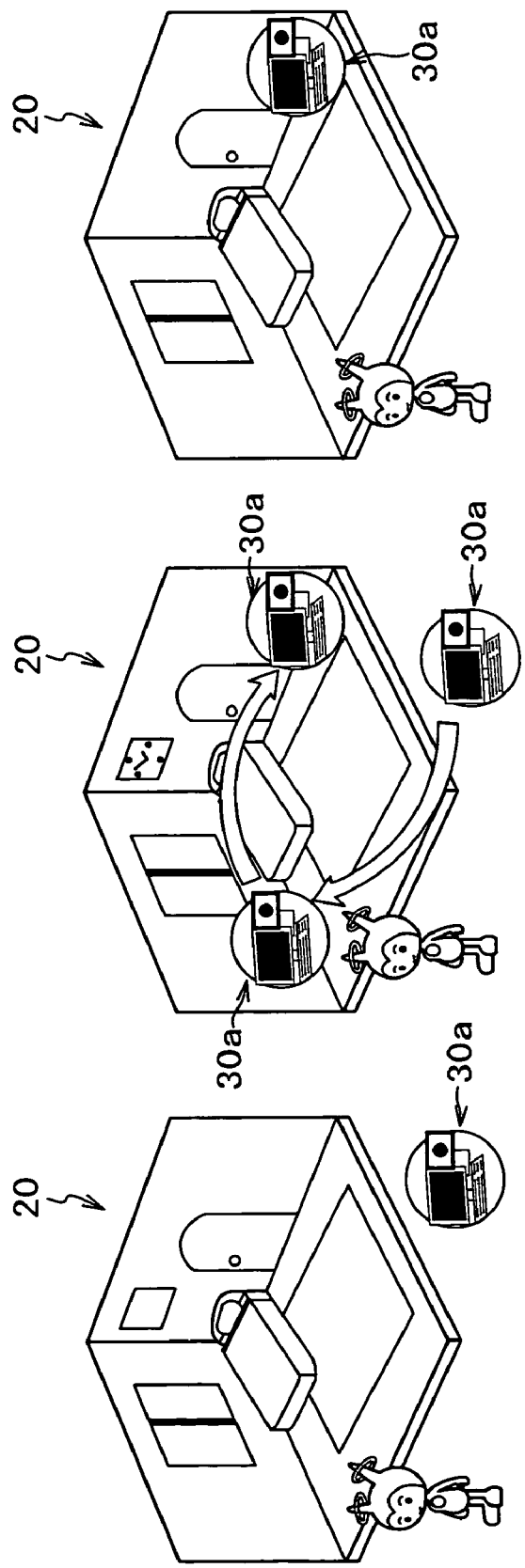

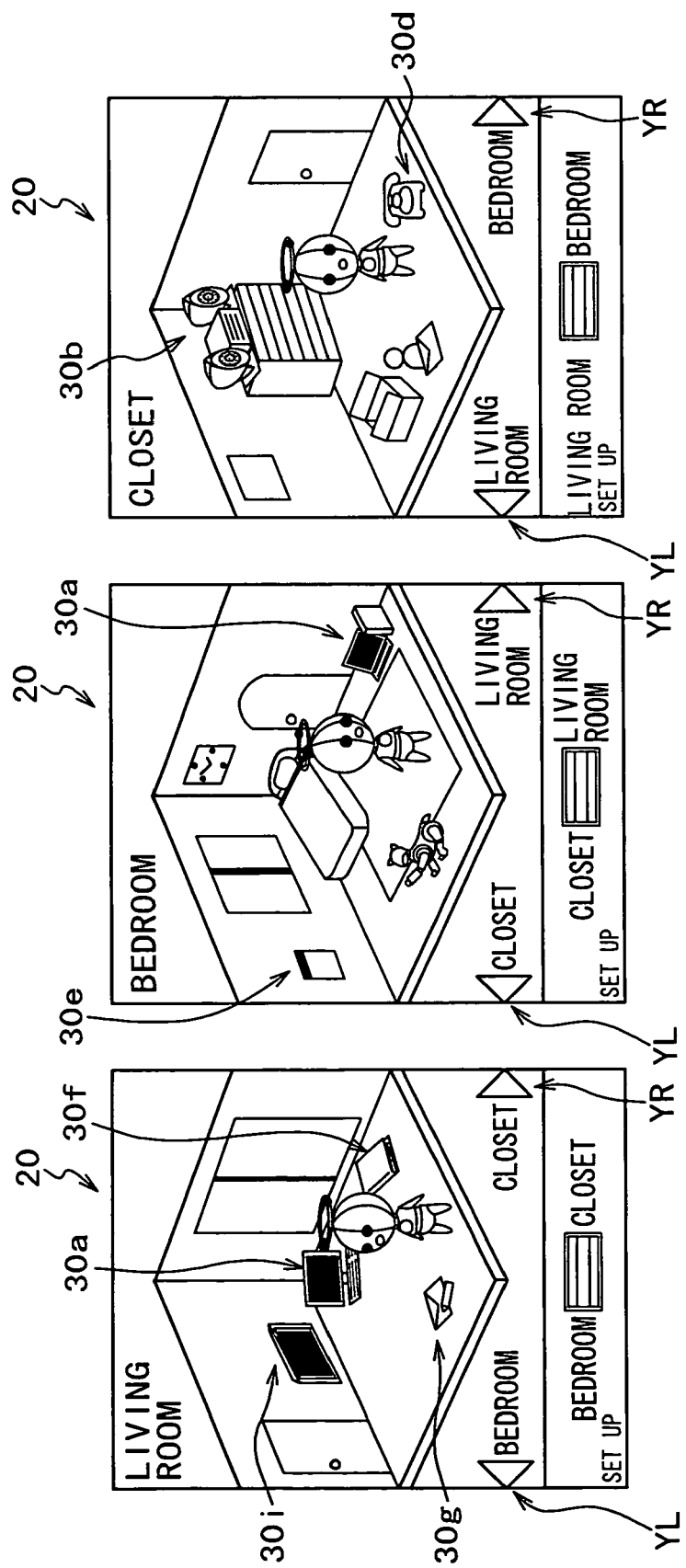

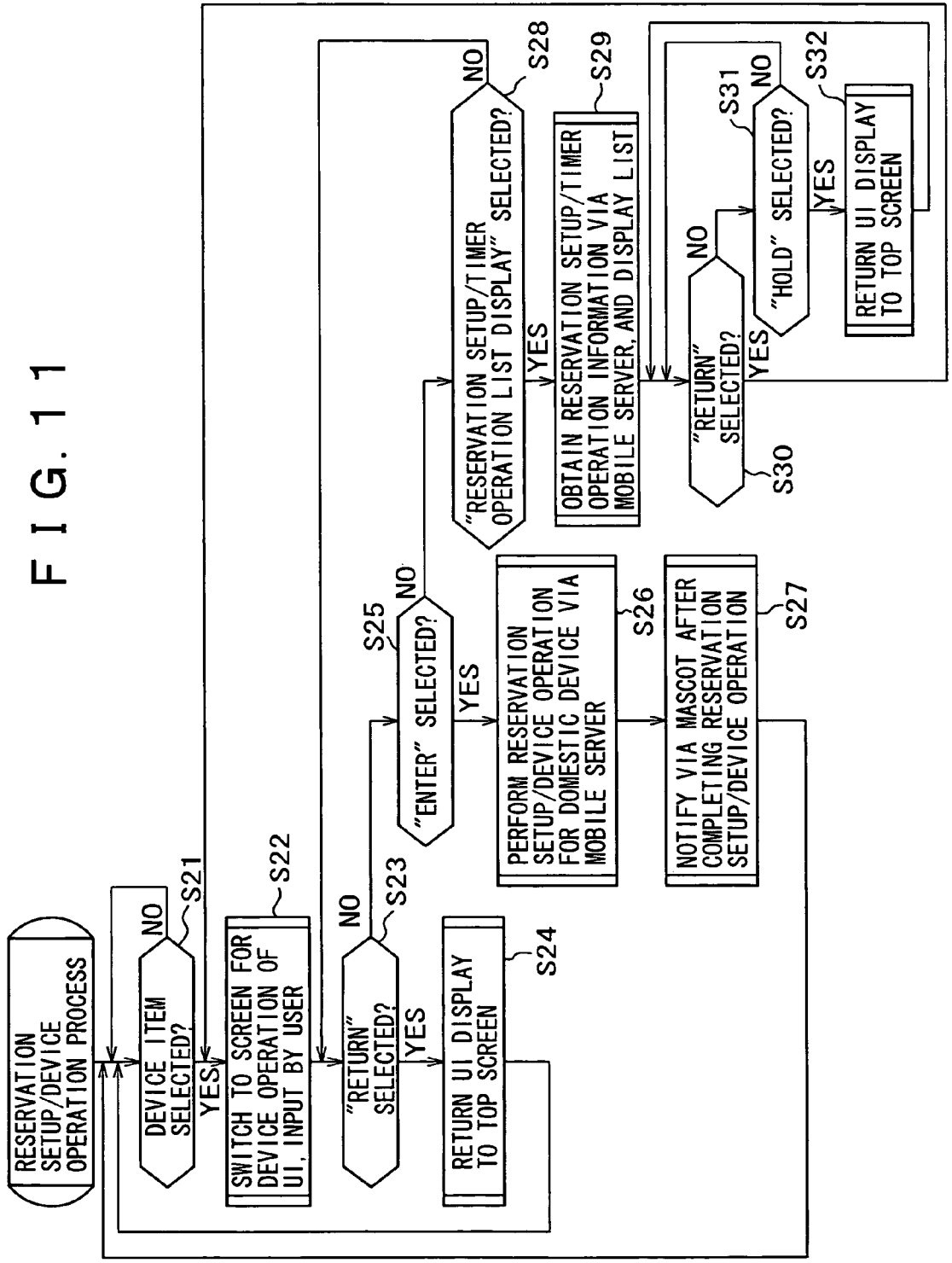

F I G. 1 2
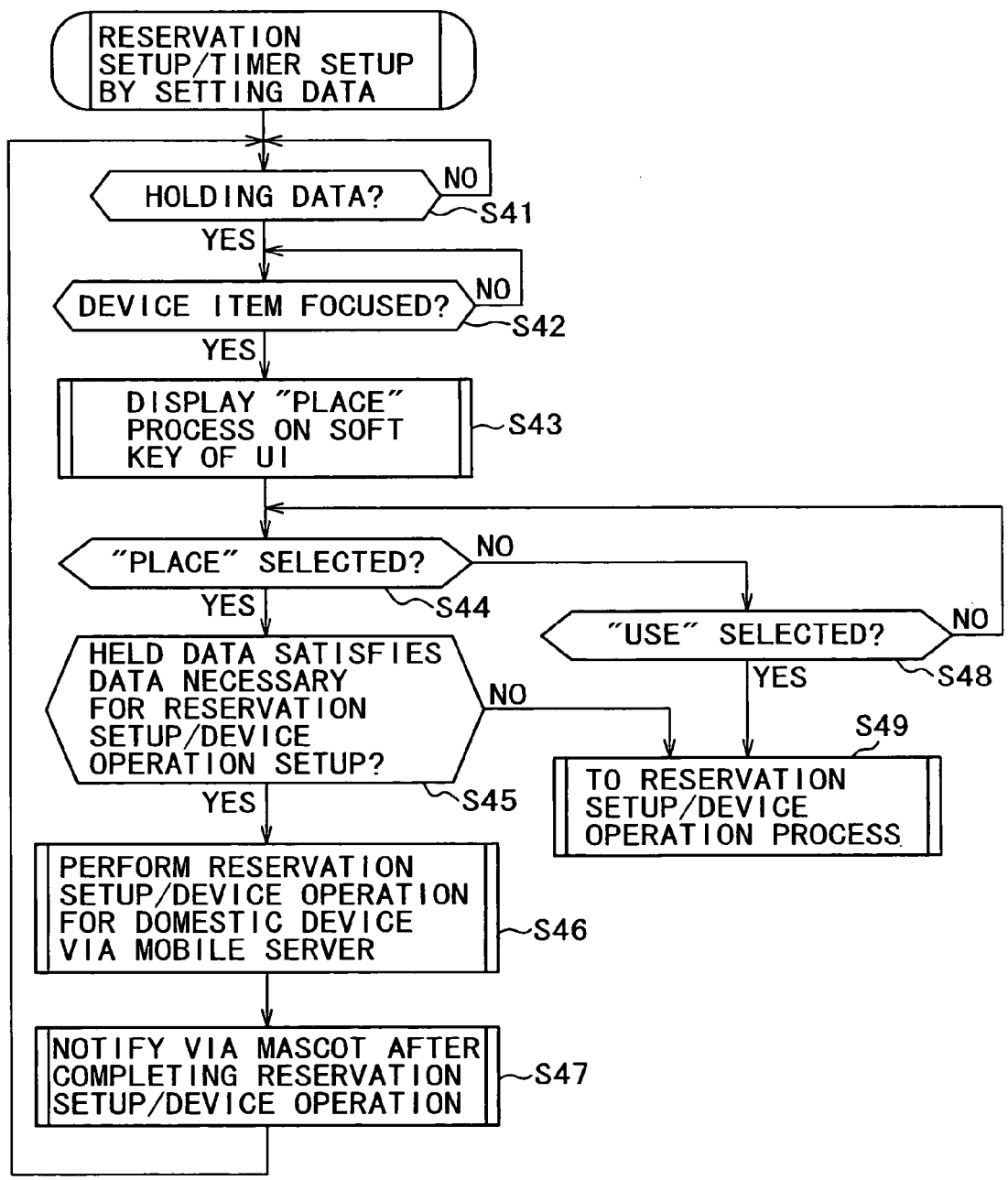

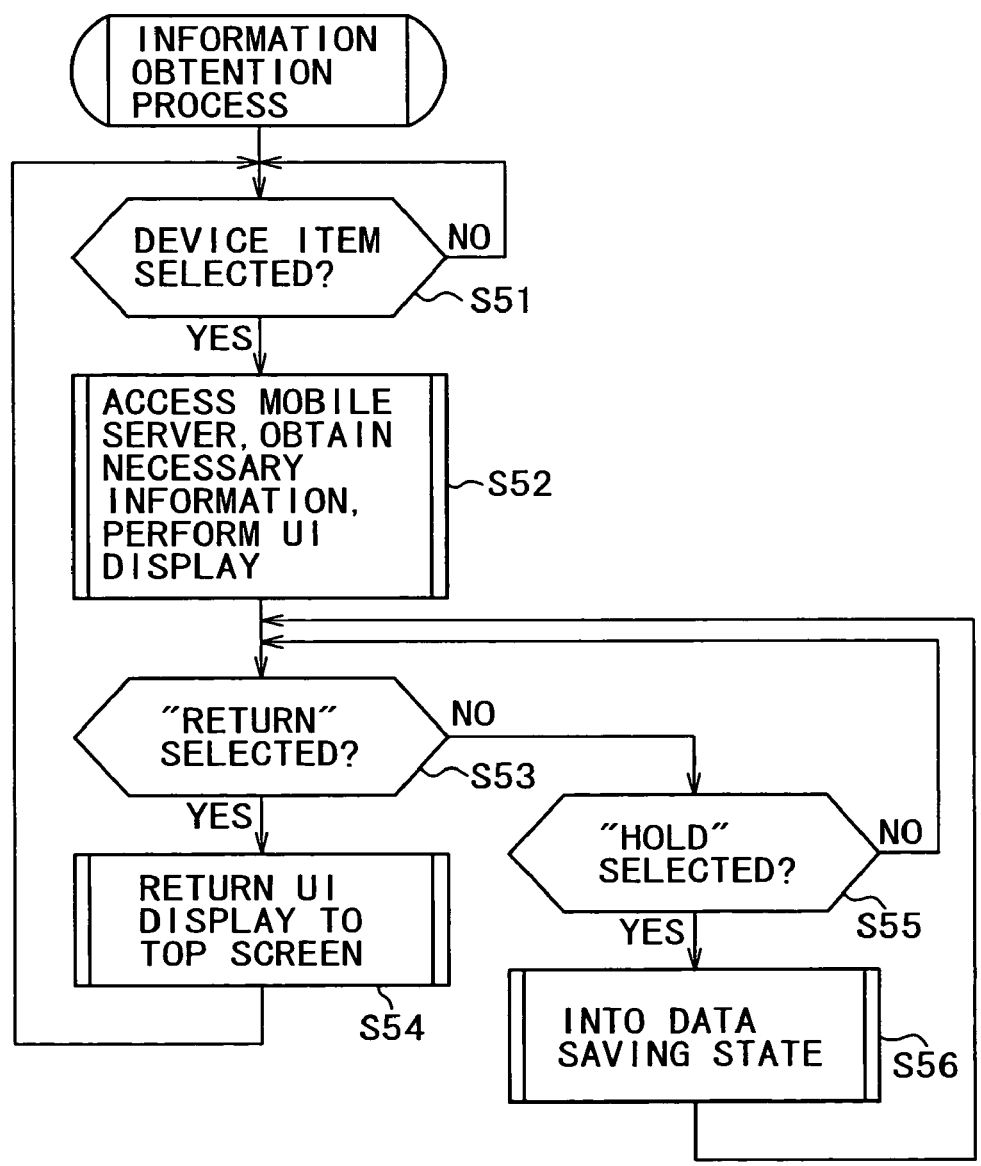
F I G. 1 4

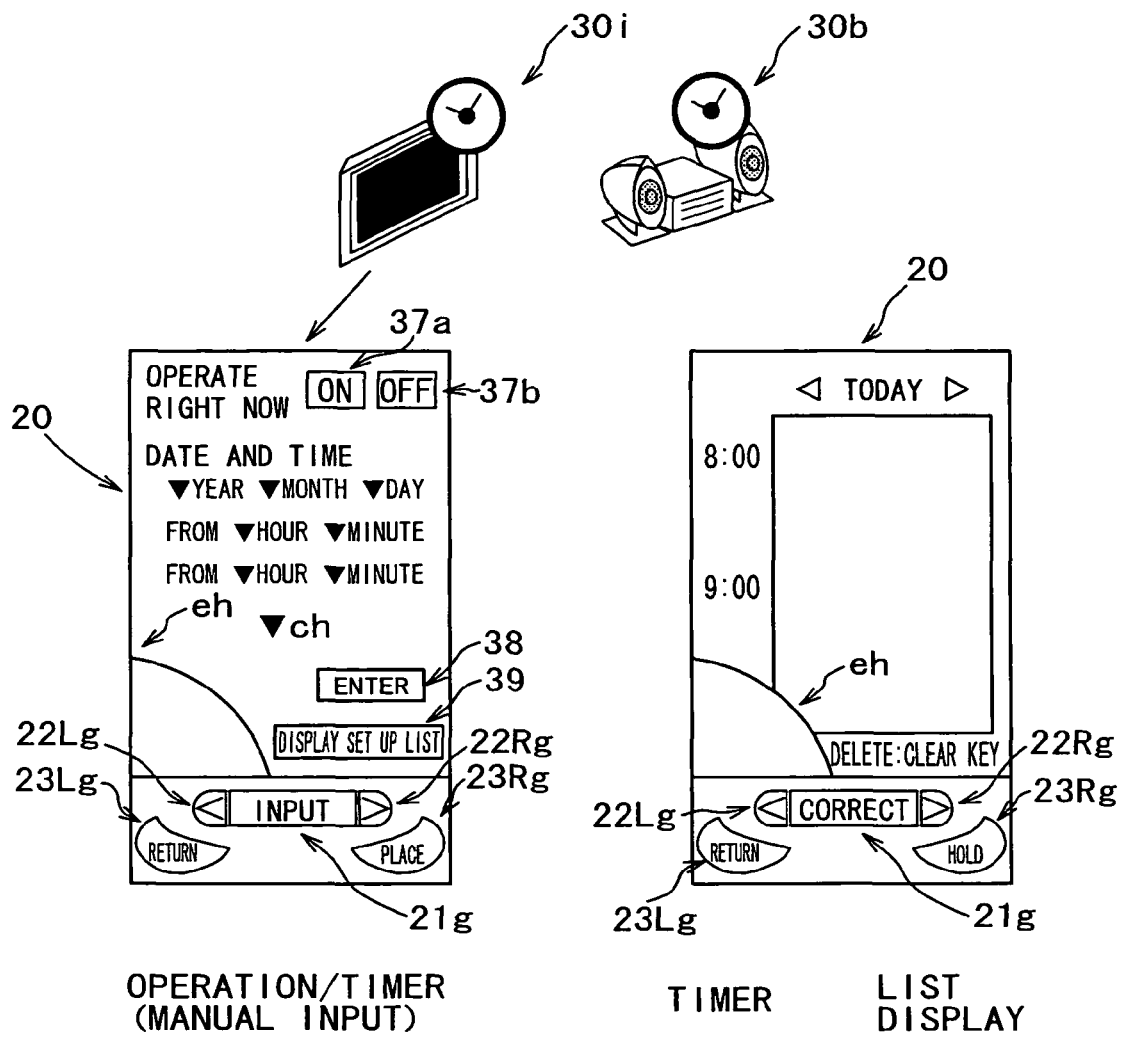

INFORMATION PROCESSING APPARATUS

CROSS REFERENCE TO RELATED APPLICATIONS

The present document is based on Japanese Priority Application JP2002-359922, filed in the Japanese Patent Office on Dec. 11, 2002, the contents of which being incorporated herein by reference to the extent permitted by law.

BACKGROUND OF THE INVENTION

1. Field of the Invention

The present invention relates to an information processing apparatus suitable for use in display control of user interfaces of portable phones, PHS (PHS: Personal Handyphone System) phone devices, PDA (PDA: Personal Digital Assistant) devices having communication functions, personal computer apparatuses equipped with communication function, for example.

2. Description of the Related Art

Conventionally, remote control systems are known which allow a remotely controllable device such as a household appliance provided within a house to be operated by remote controlling through a network.

In such remote control systems, when a programmed recording setup is performed for a video tape recorder apparatus at home using an electronic program guide (EPG: Electronic Program Guide), for example, a user acquires the electronic program guide from a predetermined webpage on the Internet etc., recognizes a broadcast date and time of a desired program, based on the electronic program guide, and newly inputs the broadcast date and time as programmed recording information into a device such as a remote controller and the like.

The inputted programmed recording information is supplied to the video tape recorder apparatus installed at the user's home through, for example, the Internet and a domestic network provided in the user's home. As a result, the user can perform the programmed recording setup in the remote place for the video tape recorder apparatus installed in the house.

Such a remote control system provides an improvement in convenience as well as an improvement in each user's standard of living, therefore constituting a system with high prospective of popularization.

SUMMARY OF THE INVENTION

The following situations may apply to such a remote control system. At the beginning of a new system before its widespread use, there are few users who are well used to handling the new system, so that it may be difficult for each user to handle a device compatible with the system.

If there is difficulty in handling such a device, it may give a negative impression to the user who is thinking of introducing the system and may limit the popularization of such systems.

The present invention has been proposed in view of the above problem and it aims to provide an information processing apparatus which can contribute to a popularization of the system by allowing the user to easily operate the device compatible with the system.

The information processing apparatus according to the present invention reproduces and displays items such as the user's room and devices installed in the user's room as an image on an interface.

Considering the fact that the user is familiar with his or her own room where he or she lives and with the devices installed in the room, if the user's room is virtually reproduced and displayed on the interface, the user may be provided with an interface which allows an intuitive and relatively simple operation of items, e.g., the devices installed in the room.

BRIEF DESCRIPTION OF THE DRAWINGS

The above and other features and advantages of the present invention will become more apparent from the following description of the presently exemplary preferred embodiments of the present invention taken in conjunction with the accompanying drawings, in which:

FIG. 2 shows a flow chart showing an operation of a portable phone device at the time of an initial setup of the information processing system of the preferred embodiment of the present invention;

FIG. 4A to FIG. 4C are views showing examples of images of rooms to be selected by the user at the time of the initial setup;

FIG. 6 shows a view showing an example of an image of items to be selected by the user at the time of the initial setup;

FIGS. 7A to 7C are views showing that the item selected by the user at the time of the initial setup is being installed in the selected room;

FIGS. 8A to 8C are views showing each item and agent installed in each room selected by the user through the initial setup;

FIG. 11 shows a flow chart showing a flow of information processing operations of the portable phone device when the reservation setup/apparatus operation item is selected by the user;

FIG. 12 shows a flow chart showing a flow in which a reservation setup of another device by using temporarily held information;

FIG. 14 shows a flow chart showing a flow of information processing operations of the portable phone device when the information item is selected;

FIGS. 16A and 16B show views showing another example of the user interface to be displayed when the reservation setup/apparatus operation item is selected by the user;

DESCRIPTION OF THE PREFERRED EMBODIMENTS OF THE INVENTION

Figure 1:
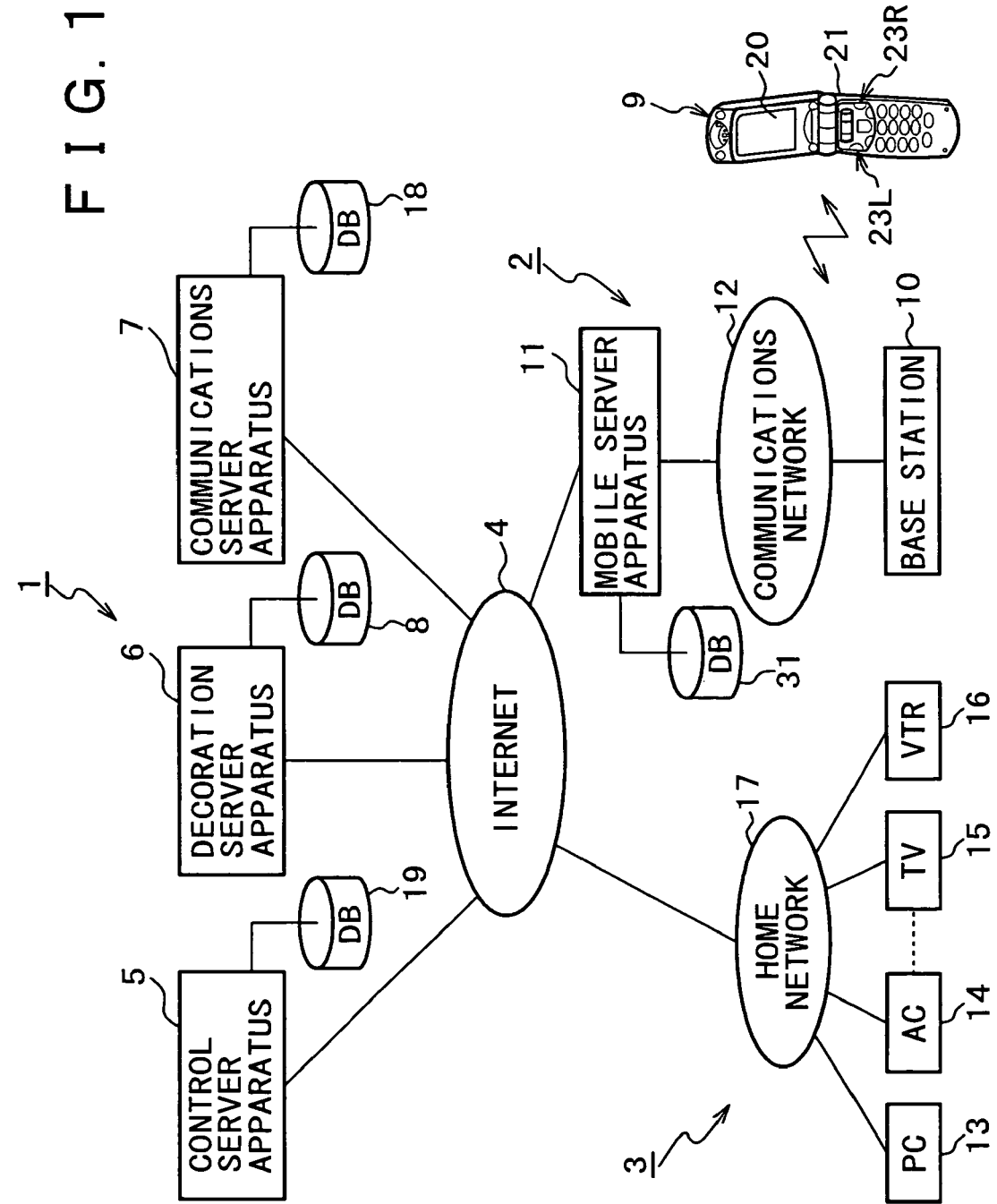
FIG. 1 shows a block diagram of an information processing system to which a preferred embodiment of the present invention is applied.

FIG. 1 is a block diagram showing a constitution of an information processing system as a preferred embodiment of the present invention. Such information processing system aims at allowing the user to handle usual information seamlessly among various information processes (it is a system which permits one piece of information to be commonly used between a plurality of information processes).

In particular, for example, the electronic program guide (EPG: Electronic Program Guide) acquired from the predetermined site is a type of time information. Thus, in the information processing system of the preferred embodiment of the present invention, when the electronic program guide is taken in, the electronic program guide in its information form is transparently used for remote control of a desired device, transferred to an acquaintance by attaching to an e-mail, used for a setup of wake up time, etc., so that one information data may be extended to various information processes and seamlessly handled between information processes.

On the other hand, the information processing system of the preferred embodiment of the present invention is provided as a brand new system, so that there is a possibility that it may be a system difficult for the user to become familiar to.

However, in the information processing system of the preferred embodiment of the present invention, a device which handles information is provided with graphic display of devices to be operated, information, etc. and a character referred to as an agent or a mascot with motion corresponding to the handling of information (animation display) is displayed in the case of handling the information, so that the device may be intuitively and easily operated so as to provide a system which can be easily handled (become easily familiar) by the user.

[System Configuration]

The information processing system of the preferred embodiment of the present invention as shown in FIG. 1, for example, is constructed by mutually interconnecting, through a network such as the Internet 4, a server system 1 including a plurality of server apparatuses, a communication system 2 which allows communications using a mobile device, and a domestic network system 3 provided in a user's house.

[Server System]

In the case of the remote control system, "device", "information", and "communication (communications)" are considered as objects with which the user is in contact in his or her everyday life, so that the server system 1 is constituted by a control server apparatus 5 which controls each apparatus of the domestic network system 3, a decoration server apparatus 6 which performs information such as each user's address book and a schedule book, for example, and a communications server apparatus 7 which performs communication management of the systems 1 to 3.

In this way, the server apparatuses 5 to 7 provided for respective objects may distribute the load on server system.

It should be noted that, in this example, the server system 1 is constituted by three server apparatuses 5 to 7 which are physically separated, however one server apparatus may be provided so as to manage the device, the information, and the communication, respectively.

Further, four or more server apparatuses may be provided so that each server apparatus may share the device, the information, and the communication. In this case, the load on the server system 1 may be distributed to many server apparatuses so that a load on each server apparatus may be reduced.

The control server apparatus 5 has stored therein information indicating apparatuses such as a television receiver set, a video tape recorder apparatus, an air-conditioner apparatus, a personal computer apparatus, etc. which are owned by each user and installed at the user's home, command information for operating each apparatus by remote control, etc.

For example, when remote control information is transmitted by the user using the mobile device such as a portable phone device, a device specified based on the transmitted remote control information is remotely controlled by the control server apparatus 5.

It should be noted that, in this example, the control server apparatus 5 is provided on the server system 1 side so as to remotely control every user's apparatus collectively, however, the control server apparatus 5 may be provided on the domestic network system 3 side. In this case, the control server apparatus 5 is to operate as a server apparatus dedicated to the user.

The decoration server apparatus 6 has a database 8 (DB) in which data individually owned by each user are stored.

Specifically, each user may upload the individually owned data such as for example a "scrapbook", a "schedule book", a "telephone directory", an "address book", etc. through client terminals such as the personal computer apparatus and the mobile device (the portable phone device etc.). The decoration server apparatus 6 memorizes or stores the uploaded data in the database 8.

In the scrapbook, various data for which the user wishes are written and stored which are, for example, "arbitrary character strings" such as a memorandum and a text inputted by the user, "program data (a title, a channel, broadcast time, a performer, etc.)" of the electronic program guide downloaded from the predetermined site, still image data in the JPEG format (Joint Photographic Experts Group) and GIF (Graphics Interchange Format), for example, and data of the title, and moving image data in the MPEG format (Moving Picture Experts Group) and data of the title (hereafter these still image data and moving image data are collectively referred to as "image data"), etc.

For example, a title of each schedule such as waiting and a meeting, a date and time of each schedule, and contents (details) of each schedule, etc. are written and stored in the schedule book.

Telephone numbers and e-mail addresses of each user's acquaintances, friends, and companies are written and stored in the telephone directory and an address book respectively.

The communications server apparatus 7 obtains, for example, "news (or information on the Internet)", such as weather information, a timetable of a train or a bus, constellation fortune-telling, stock quotations, and position information from the predetermined site on the Internet so as to store the news in the database 18. These information data are provided to each user's personal computer apparatus through the Internet 4, and also provided to the mobile device such as the portable phone device through a mobile server apparatus 11.

It should be noted that a free space such as for example an electronic bulletin board (BBS: Bulletin Board System) is provided on the communications server apparatus 7 or the mobile server apparatus 11 so as to upload, to the free space, the user's data permitted to be open to public or the news obtained from the predetermined site.

When it is desired to use the free space within a predetermined group, a group registration is performed to receive an issued group ID, so that a common space on the server apparatus 7 lent to the group may be used by the user in the group.

[Information Notation Form]

The individually owned data and each information data may be written based on the XML format (XML: eXtensible Markup Language), for example. The XML format may define a tag independently, and therefore allow simple text to be processed as "data."

For example, by using the XML format, the contents can be written with a structure, such as "<date and time>", which is easily understood by man. Further, a "number" described in the tag of <date and time> by using "schemas (XML Schema etc.)" may be used as "numerical data indicating date and time" of a predetermined application.

Thus, the individually owned data and each information data may be, for example, written as follows:
memorandum writing

```
<memorandum/>
schedule
<title/>
<date and time/>
<contents/>
program data
<title/>
<date and time/>
<channel/>
image
<title/>
``` binary data (in the case of the XML notation, it is converted to MIME (Multipurpose Internet Mail Extensions).

As for the individually owned data, each user may upload the data to the database 8 by using the mobile device such as the portable phone device, the personal computer apparatus at home, etc., which will be described below. The uploaded individually-owned data are written in the XML notation as described above, and therefore handled seamlessly among the information processes (among different systems), for example, the data may be used for remotely controlling a device at home, setting up wake up time, etc.

[Communication System]

In the case of the information processing system, a portable phone device 9 is utilized as an example of the mobile device to be one of the client terminals. Thus, in FIG. 1 a schematic system configuration of a cellular phone company is illustrated as the communication system 2.

In particular, the communication system 2 is constructed by mutually interconnecting a base station 10 which relays wireless communications of the portable phone device 9, a mobile server apparatus 11 which performs communications control for the server system 1, and the domestic network system 3, through a communications network 12.

Information from not only the portable phone device 9 but also other apparatuses such as the personal computer apparatus and a PDA device can also be uploaded to each of the server apparatuses 5 to 7 of the server system 1. However, it is often the case that the information uploaded from an apparatus of high information processing performance such as the personal computer apparatus is large in terms of an amount of information. The mobile server apparatus 11 has an information capacity conversion function, and therefore converts the information of a large amount into that of an amount to be processed by the portable phone device 9, then transmits it to the portable phone device 9.

It should be noted that, in this example, a description will be carried out assuming that the portable phone device 9 is used as the client terminal, however, for example, a PHS telephone (PHS: Personal Handyphone System), a PDA device (PDA: Personal Digital Assistant) which has a communication function, or other apparatuses such as a portable type personal computer apparatus (notebook type etc.) equipped with the communication function may be used as the client terminal.

[Domestic Network System]

The domestic network system 3 is constructed by using middleware, such as for example, Universal Plug and Play (UPnP), Jini, and HAVi (Home Audio Video Interoperability Architecture). For example, devices which are subjected to the remote control (devices to be remotely controlled) such as a personal computer apparatus 13 (PC) installed at the user's home, an air-conditioner apparatus 14 (AC), a television receiver set 15 (TV), a video tape recorder apparatus 16 (VTR), etc. are connected to the domestic network 17 so as to constitute the domestic network system 3.

Based on remote control by the portable phone device 9, the control server apparatus 5 of the server system 1 controls each of the devices to be remotely controlled, through the Internet 4 and the domestic network 17.

[System Operation]

When the information processing system of the preferred embodiment of the present invention is used, at first "user registration" is carried out so as to receive an issued user ID information data (user ID) and a predetermined password, then a room of the user's home is registered to the portable phone device 9 as an "initial setup", while "items", such as each device installed in each room, a scrapbook, a schedule book, etc. are registered. Further, the character called "the agent (or the mascot)" is selected as a user's avatar (Avatars: alter ego, one's incarnation).

[User registration]

When the user operates the portable phone device 9 and accesses the mobile server apparatus 11, an input screen of the user ID and the password as well as a screen for specifying the user registration are transmitted from the mobile server apparatus 11 to the portable phone device 9.

When the user registration is specified by the user, the mobile server apparatus 11 transmits the input screen for predetermined items which are needed for the user registration to the user's portable phone device 9.

The user inputs the predetermined items to the input screen and replies the mobile server apparatus 11. The mobile server apparatus 11 checks the inputted items replied by the user, and issues the user ID and the predetermined password to the user when there is no defect in the inputted items, whereby the user registration is completed.

In addition, the mobile server apparatus 11 registers the user ID and the password as well as the input matter to a database 31 (DB) so as to refer to them the next time the user wishes to login to the system.

It is assumed that the mobile server apparatus 11 issues and manages the user ID and the password in response to the mobile devices as an example, however, the communications server apparatus 7 etc., for example, may issue and manage the user ID and the password when the user registration is performed by using another client terminal such as the personal computer apparatus.

[Initial Setup]

After performing the user registration, the items to operate are registered (initial setup). A flow chart of FIG. 2 shows a flow of a system operation at the time of the initial setup.

After authenticating the user based on the user ID and the password, the mobile server apparatus 11 transmits a predetermined menu display screen to the portable phone device 9. The flow chart as shown in FIG. 2 says that the flow starts when the user selects "initial setup" from the menu displayed on the display screen 20 of the portable phone device 9.

Since the initial setup has been selected by the user, the mobile server apparatus 11 transmits an application program for the initial setup to the user's portable phone device 9 in step S1.

Receiving the application program, the portable phone device 9 displays an agent selection screen in step S2. The user operates the portable phone device 9 so as to select a desired agent out of the displayed agents.

In step S3 a CPU (Central Processing Unit) of the portable phone device 9 determines whether or not the selection operation for the agent has been carried out so as to determine whether or not the agent has been selected by the user. At a time when the agent is selected by the user (at a time when the agent selection operation is detected), information about the agent selected by the user (for example, the agent name) is stored and the process as shown in the flow chart is caused to go to step S4.

On the other hand, when the agent selection operation is not detected by the user, the portable phone device 9 determines whether or not the user has specified a logoff in step S11. When the logoff has not been specified, step S3 and step S11 are repeatedly executed until the agent selection operation is detected in step S3. When the logoff is specified, execution of each step of the flow chart as shown in FIG. 2 is interrupted at this stage, and the process is ended.

Figure 3A:
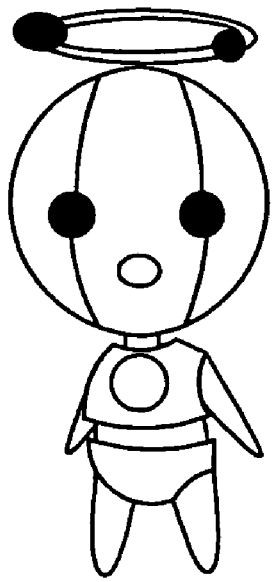
FIG. 3A and FIG. 3B are views showing examples of agent's images to be selected by a user at the time of the initial setup.
Figure 3B:
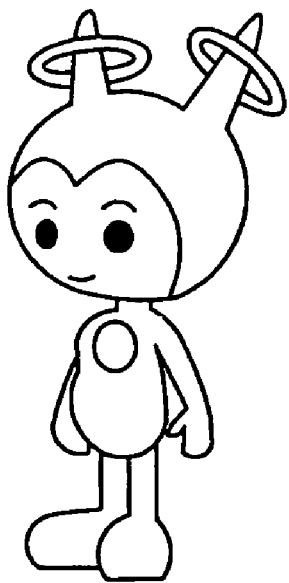

FIGS. 3A, 3B show an example of the agents. The agent as shown in FIG. 3A is "an angel type agent." The agent as shown in FIG. 3B is a "devil type agent." The user selects a desired agent out of such agents.

When the user selects a desired agent, the portable phone device 9 displays an image of a predetermined room, based on the application program in step S4.

FIGS. 4A to 4C show an example of the image of the room. FIG. 4A illustrates an image of a "living room." FIG. 4B shows an image of a "bedroom." FIG. 4C illustrates an image of a "closet." The image of each room may be displayed on a display screen 20 one by one according to the user's operation of the portable phone device 9.

Figure 5:
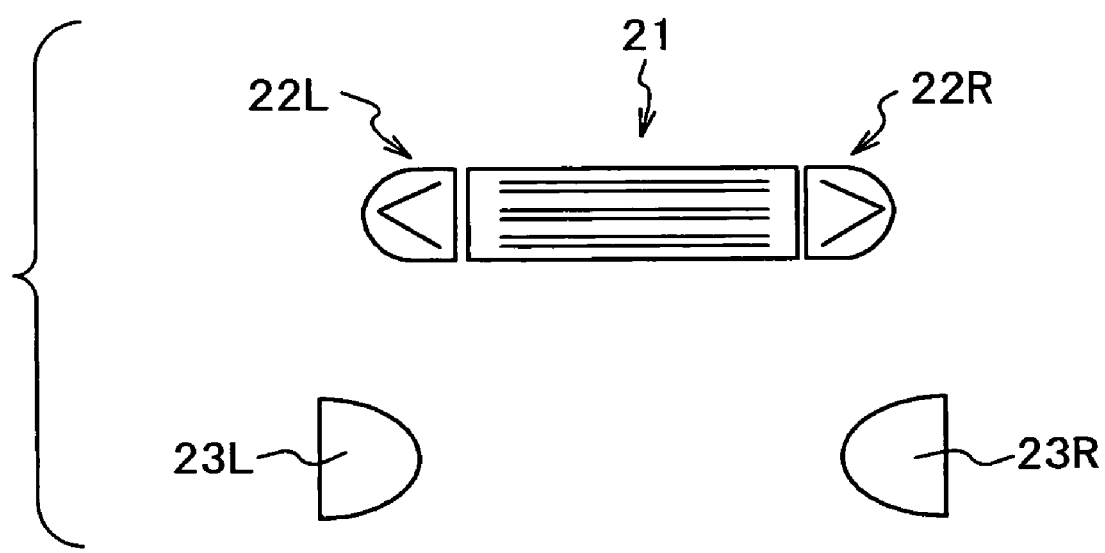
FIG. 5 shows a view showing an example of operation keys provided in the portable phone device used by the user.

In other words, in the case of the portable phone device 9 used in the information processing system of the preferred embodiment of the present invention, a jog dial 21 is provided which is rotatable along a longitudinal direction of the portable phone device 9 body (that is rotatable in the upward and downward directions) as shown in FIG. 1 and FIG. 5. Further, a right key 22R and a left key 22L are respectively provided in the proximity of both ends of the jog dial 21. Still further, a right soft key 23R and a left soft key 23L are respectively provided in the proximity of the right key 22R and in the proximity of the left key 22L.

The image of any room as well as an image YR of a rightward arrow, an image YL of a leftward arrow, and the names (letters) of the rooms to be changed and displayed are displayed on the display screen 20 of the portable phone device 9. The image YR of the rightward arrow and the name of the room to be changed and displayed indicate the room to be changed and displayed when the right key 22R is depressed. The image YL of the leftward arrow and the name of the room to be changed and displayed indicate the room to be changed and displayed when the left key 22L is depressed.

For example, FIG. 4A shows the image of the room of the "living room" displayed on the display screen 20. When the right key 22R is depressed in this status, the CPU of the portable phone device 9 switches the image of the room "living room" to the image of the room "closet." When the left key 22L is depressed, the image of the room "living room" is switched to the image of the room "bedroom."

Likewise FIG. 4B shows the image of the room "bedroom" displayed on the display screen 20. When the right key 22R is depressed in this status, the CPU of the portable phone device 9 switched the image of the room "bedroom" to the image of the room "living room." When the left key 22L is depressed, the image of the room "bedroom" is switched to the image of the room "closet."

In this example, it is assumed that the displayed images of the display screen 20 are switched by depressing the right key 22R and the left key 22L, however, the jog dial 21 may be rotated so as to change the displayed images.

In this way the user operates the right and left keys 22L and 22R so as to display the image of a desired room on the display screen 20, then depresses the left soft key 23L as shown in FIG. 1 and FIG. 5 so as to issue instructions to set up the desired room.

In other words, letters "set up" displayed on the lower left of the display screens as shown in FIGS. 4A to 4C indicate that setup keys of the desired rooms are assigned to the left soft key 23L. Thus, in step S5 the CPU of the portable phone device 9 determines whether or not the left soft key 23L has been depressed so as to determine whether or not the setup of the desired room has been specified. At a time when the depression operation of the left soft key 23L is detected, the information on the room selected by the user (for example, the room name etc.) is stored and the process as shown in the flow chart is caused to go to step S6.

On the other hand, when the user has not selected a desired room, the portable phone device 9 determines whether or not the logoff has been specified by the user in step S12. When the logoff has not been specified, the step S5 and step S12 are repeatedly executed until it determines that the user has selected a desired room in step S5. When the logoff has been specified, the execution of each step of the flow chart as shown in FIG. 2 is interrupted at this stage, and the process is ended.

The image of each room as shown is designed assuming a structure of an ordinary house. Therefore, the user may select the same room as his or her own room or a similar one.

Further, the jog dial 21 provides a pressing or depression operation in addition to the rotation operation. Thus, when the jog dial 21 is depressed, the CPU of the portable phone device 9 may recognize the room currently displayed on the display screen 20 as having been selected (set up) by the user.

Next, in step S6, since the desired room has been selected by the user, the CPU of the portable phone device 9 displays the image of each item on the display screen 20, based on the application program.

FIG. 6 shows an example of image in which each item is displayed on the display screen 20. As can be seen from FIG. 6, the image of a plurality of items such as for example a personal computer apparatus 30a, a stereo unit 30b, a video tape recorder apparatus 30c, a telephone 30d, a schedule book 30e, a scrapbook 30f, a message function 30g, a program table 30h, a television receiver set 30i, etc. is displayed on the display screen 20.

According to the rotation operation of the jog dial 21 as shown in FIG. 1 and FIG. 5, the CPU of the portable phone device 9 changes and displays an item image as in the display screen 20 in order of the "personal computer apparatus 30a"→the "stereo unit 30b"→the "video tape recorder apparatus 30c"→the "telephone 30d", for example.

From the item images thus displayed one by one, the user selects an item installed in the selected room or an item desired by the user to be installed by depressing the jog dial 21, for example.

In step S7 the CPU of the portable phone device 9 determines whether or not the jog dial 21 has been depressed so as to determine whether or not the user has selected a desired item. On detecting that the desired item has been selected by the user, at this timing the process as shown in the flow chart is caused to go to step S8.

On the other hand, when the user has not selected a desired item, the CPU of the portable phone device 9 determines whether or not the logoff has been specified by the user, in step S13. When the logoff has not been specified, the step S7 and step S13 are repeatedly executed until it is determined that a desired item has been selected by the user in step S7. When the logoff has been specified, at this stage the execution of each step of the flow chart as shown in FIG. 2 is interrupted, and the process is ended.

Then, in step S8 since the desired item has been selected by the user, the CPU of the portable phone device 9 controls and displays a preliminary selection screen showing the "agent", the "room", and the "item" which are currently selected on the display screen 20. FIG. 7A is an example of the preliminary selection screen.

The preliminary selection screen of FIG. 7A indicates that the "devil type" agent is selected by the user and the personal computer apparatus 30a is currently selected as an item. As it can be seen from FIG. 7A, the CPU of the portable phone device 9 displays the agent selected by the user in the lower left corner of the display screen 20 and displays the selected item (in this case, the personal computer apparatus 30a) in the lower right corner of the display screen 20. Then, the selected room is displayed in a larger size on the backsides of the agent and the item. By means of such a preliminary selection screen, the user checks the room, the agent and the item which are currently selected by himself or herself.

Next, the user installs the selected item in a desired position in the room. For example, as for the position, in the room, where the item may be installed, several installation locations are defined in advance for each item. When the jog dial 21 is rotated in a status where the preliminary selection screen is displayed, according to the rotation operation of the jog dial 21, the CPU of the portable phone device 9 moves and displays the item currently selected (in this case, the personal computer apparatus 30a) to the pre-defined installation locations.

When the item is displayed at a desired installation location among the installation locations where the item is thus moved and displayed, the user depresses the jog dial 21. Then, as shown in FIG. 7B the CPU of the portable phone device 9 moves and displays the personal computer apparatus 30a which is the selected item in this case, as if it were floating in the room, so as to install and display it in the selected installation location as shown in FIG. 7C.

It should be noted that, in this example, as the installation locations of the item, it is assumed that several installation locations are defined in advance, however, it may be installed at any installation location. In this case, the CPU of the portable phone device 9 stores the installation location of the item by means of XY coordinates values, pixel values, etc. on the display screen, for example.

Next, the CPU of the portable phone device 9 displays, for example, a message "continue item selection?" each time an item is arranged. In step S9, according to the message, the CPU of the portable phone device 9 determines whether or not the user has performed the operation (continuation operation) which requires to continue the arrangement of the item. When the continuation operation has been carried out by the user, the process is returned to step S7, the image of each item transmitted from the mobile server apparatus 11 is displayed again, and the user is prompted to select a desired item. When an item is selected by the user, the item is displayed at a specified location in the room.

On the other hand, when the continuation operation has not been carried out by the user (when the user has issued instructions to terminate the device selection), the portable phone device 9 stores each of the information data indicating the agent, the room, the item and its installation locations (for example, the X, Y coordinate values, etc.) which are selected by the user in internal memories (or external memory etc.) of the portable phone device 9. While, an image into which the agent and each of the items selected by the user are incorporated is formed in the room selected by the user so as to be displayed on the display screen 20 as a selection screen. Thus, all processes as shown in the flow chart of FIG. 2 are completed.

As described above, the agent selected by the user is the user's avatar (alter ego). Further, the image of the room selected by the user has the same structure as the user's room or a similar one. Still further, each item installed in the image of the room is installed in the same place (or a desired place) as the user's home. Thus, as to the image displayed on the display screen 20 of the user's portable phone device 9, "an image of a virtually reproduced user's room" may be displayed.

With respect to the room selected by the user, FIGS. 8A to 8C show examples of images into which the agent and each item selected by the user are incorporated. FIG. 8A is an image of the "living room." The image of the "living room" is formed by the angel type agent, the television receiver set 30i, the personal computer apparatus 30a, the scrapbook 30f, the message function 30g, etc., which are selected by the user.

Likewise, FIG. 8B is the image of the "bedroom." The image of the "bedroom" is formed by the angel type agent, the personal computer apparatus 30a, the schedule book 30e, etc. which are selected by the user.

Likewise, FIG. 8C is the image of the "closet." The image of the "closet" is formed by the angel type agent, the stereo unit 30b, the telephone 30d., etc. which are selected by the user.

It should be noted that, in this example, the personal computer apparatuses 30a are installed in the bedroom and the living room respectively, which indicates that the user owns two sets of personal computer apparatuses 30a and these are respectively installed in the bedroom and the living room.

FIGS. 8A to 8C show the example in which three rooms, the "living room", the "bedroom", and the "closet", are located at the user's home. In case the user's home has only one room such as a so-called one-room system apartment, for example, the "living room" is selected as the user's room. The image of each apparatus, such as the television receiver set 35 and the personal computer apparatus 30a is installed in the living room.

The user knows the installation location of each item installed in the rooms within the house in which he or she lives so that the user's room may be reproduced virtually, to thereby allow the user to operate the item easily.

Since the information, such as the item, for each room is displayed, many information data can be displayed by effectively using a limited display range as the user interface.

On the other hand, the portable phone device 9 stores, in the internal memory, each information data which indicates the agent, the room, the item and its installation location which are selected by the user and transmits it to the mobile server apparatus 11. The mobile server apparatus 11 stores the each information data in the database 31.

The mobile server apparatus 11 transmits information indicating a device, such as the television receiver set, out of the information data indicating respective items together with the user's "user ID" and "password" through the Internet 4 to the control server apparatus 5.

Receiving the information indicating the device, the "user ID", and the "password", the control server apparatus 5 controls and stores them in a database 19. Based on the "user ID" and the "password", the control server apparatus 5 communicates with each device via the user's domestic network 17 so as to obtain a control command of each device selected by the user and store the control command in the database 19.

It should be noted that, in this example, the control server apparatus 5 communicates with each device owned by the user so as to obtain the control command for the each device, however, the control server apparatus 5 may obtain the control command from a website of a manufacturer of each device. Alternatively, the user may register it to the control server apparatus 5 from the portable phone device 9 via the mobile server apparatus 11 or from the personal computer apparatus through the Internet 4.

The control server apparatus 5 communicates with each device of the user at predetermined time intervals e.g. every minute, every five minutes, every 30 minutes, every hour, etc. so as to obtain operating status information which shows the operating status (or state) of each of the devices and store the operating status information in the database 19. In addition, such operating status information may be transmitted by each device to the control server apparatus 5 at the predetermined time intervals.

The "operating status information" is information on stop, reproducing, videotape rewinding, recording, etc. in case the device is the video tape recorder apparatus 30c, or information on such as running, stop, dry/cool/heat/fan, and room temperature in case the device is the air-conditioner apparatus.

Therefore, the "user ID", the "password", the "owned device (information indicating the selected device)", "the command for each device", the "information indicating current operating status of each device (operating status information)", etc. may be stored for each user in the database 19 of the control server apparatus 5.

As will be described later, the command of the device and the information indicating the device which are stored in the database 19 may be read when the remote control of the apparatus in the user's home is specified by the user, and supplied through the domestic network 17 to each device of the user, to thereby remotely control the desired device.

The control server apparatus 5 causes the "operating status information" obtained at the predetermined time intervals to be overwritten in the database so as to always updates the "operating status information", whereby the user may access the control server apparatus 5 through the mobile server apparatus 11 so as to monitor the current operating status of the apparatus which is being remotely operated in substantially real time.

[Various Information Processing Operations]

Completion of the initial setup in this way allows variety of information processes as will be described below. In particular, when the user accesses the mobile server apparatus 11 after the initial setup, the mobile server apparatus 11 performs user authentication while an application program enabling the variety of information processes as will be described below is transmitted from the mobile server apparatus 11 to the user's portable phone device 9.

Based on the application program, the CPU of the portable phone device 9 displays and controls the images, such as the agent, the room, the item, etc., which are treated with the initial setup as described above.

[Selection of Room]

In particular, as for the display of the room, the image of the "living room", for example, is displayed by default. When the user depresses the left key 22L of the portable phone device 9 once, the image of the "bedroom" is displayed. When the right key 22R is depressed once, the image of the "closet" is displayed. According to the activation of each of the keys 22R and 22L, the image of the room is switched and displayed. By activating the right and left keys 22R and 22L, the user may display the room in which the desired item is installed on the display screen 20.

[Selection of Item]

As for item currently selected among the items installed in each room, an outline of the item is displayed and surrounded by a highlight line (e.g. a yellow line of high luminance etc.), while the agent is displayed and moved so as to be located in the vicinity of the highlighted item (hereafter the highlighted display is referred to as "focus (on)"). When the jog dial 21 as shown in FIG. 1 and FIG. 5 is rotated, the CPU of the portable phone device 9 controls each item to be focused in turn.

For example, in the example of the "living room" of FIG. 8A, we assume that the television receiver set 30i is focused by default. Each time the jog dial 21 is rotated, the CPU of the portable phone device 9 controls and displays each item so as to be focused in order of the television receiver set 30i→the personal computer apparatus 30a→the message function 30g→the scrapbook 30f. In this example, the agent is moved and displayed in a position close to the television receiver set 30i→a position close to the personal computer apparatus 30a→a position close to the message function 30g→a position close to the scrapbook 30f in turn.

[Auxiliary Display]

Figure 9A:
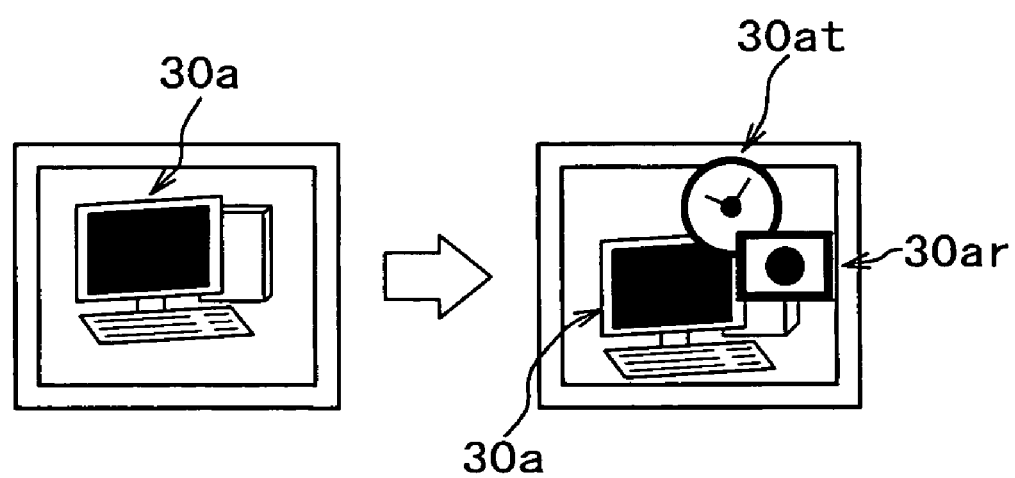
FIGS. 9A and 9B are views for explaining auxiliary display performed when an item is selected by the user (when the item is focused)
Figure 9B:
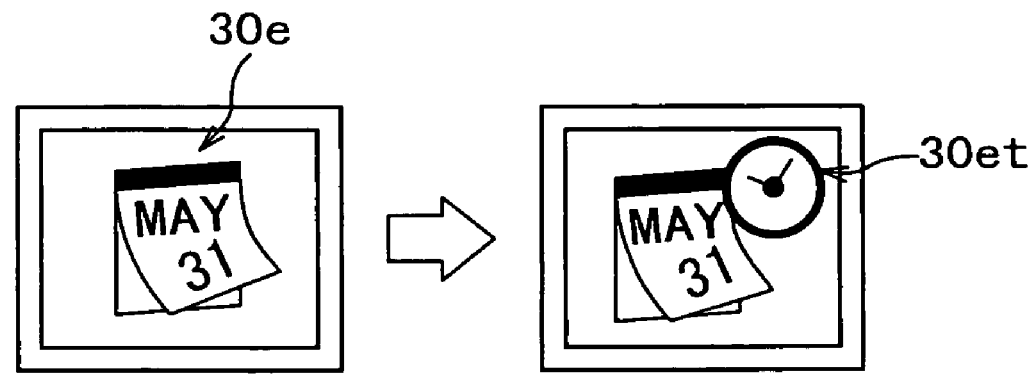

The CPU of the portable phone device 9 carries out auxiliary display of the function of the focused item. FIGS. 9A and 9B show an example of the auxiliary display.

FIG. 9A shows the auxiliary display of the personal computer apparatus 30a. As can be seen from FIG. 9A, when the personal computer apparatus 30a is focused and in case the personal computer apparatus 30a is provided with a timer function and a recording function, the CPU of the portable phone device 9 performs the auxiliary display, for example, an image 30 at of a clock indicating that the timer function is provided and an image 30ar of a recording button indicating that the recording function is provided.

In addition, when the recording function is not provided in the personal computer apparatus 30a, it performs the auxiliary display only of the image 30 at of the clock indicating that the timer function is provided.

Likewise, FIG. 9B shows the auxiliary display of the schedule book 30e. As can be seen from FIG. 9B, when the schedule book 30e is focused, the CPU of the portable phone device 9 performs the auxiliary display of the image 30et of the clock indicating that the timer function is provided, for example, on the schedule book 30e.

[Selection Operation]

In this way the user depresses the right and left keys 22R and 22L so as to select a desired room and rotates the jog dial 21 so as to select a desired item. When the desired item is focused, the jog dial 21 in the status of being depressible is depressed.

When the jog dial 21 is depressed, the CPU of the portable phone device 9 recognizes the item which is focused at the time when the jog dial 21 is depressed as having been selected by the user. The CPU of the portable phone device 9 controls and displays a screen for operation corresponding to the selected item (user interface: UI) on the display screen 20, and subsequently operates in accordance with the application program so as to correspond to the user's operation and executes an information process specified by the user.

Now, with reference to a particular example, each information processing operation will be described.

[Reservation Setup/Device Operation Process]

Figures 10A, 10B:
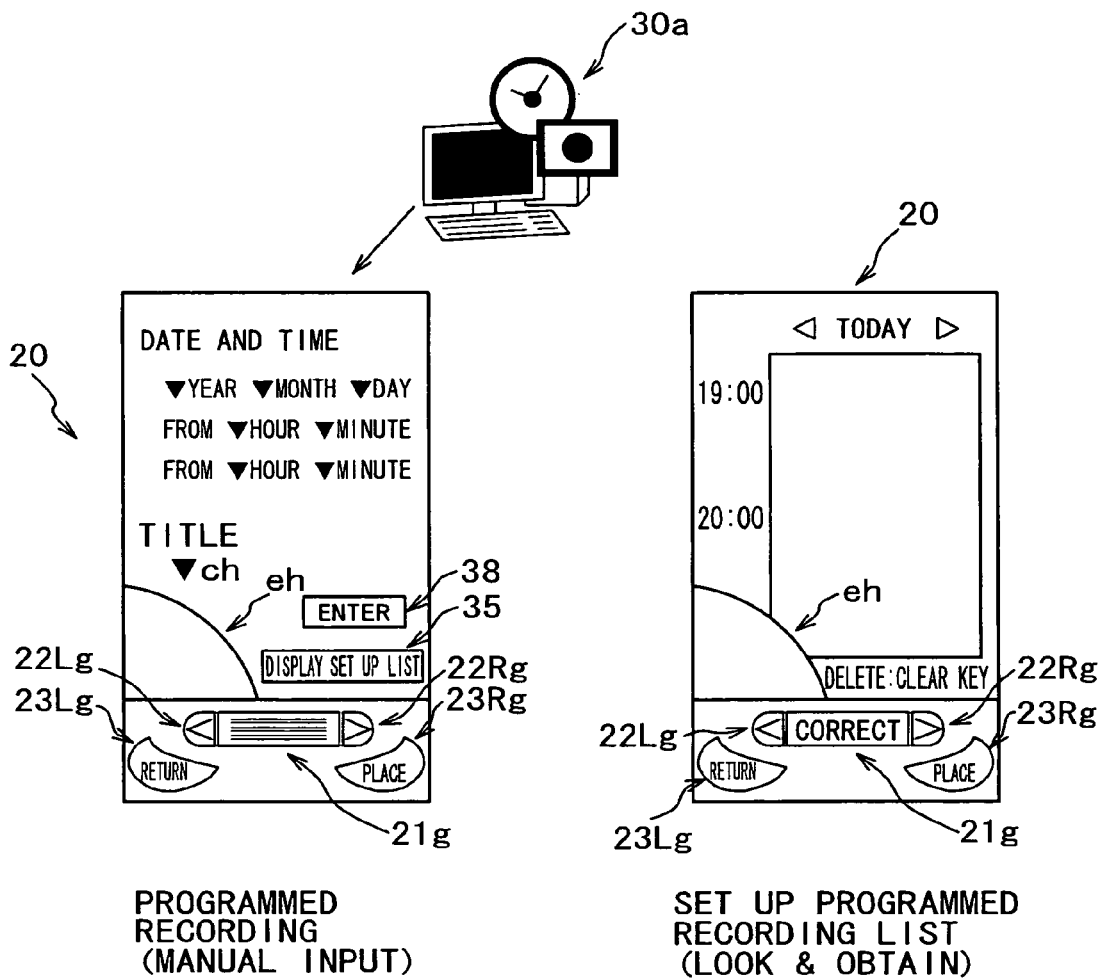
FIGS. 10A and 10B are views showing an example of an user interface displayed when a reservation setup/apparatus operation item is selected by the user.

Firstly, FIGS. 10A and 10B show an example of the user interface displayed in case a "reservation setup/apparatus operation" item for the personal computer apparatus 30a, for example, is selected as an item. Among these, FIG. 10A is a manual input screen into which the user manually inputs each data, and FIG. 10B is a list display screen of a set up list.

As to the manual input screen as shown in FIG. 10A, input items such as the "date and time", a "start time", an "end time" and the "title" and the "channel" for reservation are displayed. A enter button 38 for transmitting instructions to determine each item which is inputted is displayed. By operating the keys of the portable phone device 9, the user manually inputs a desired data for each of the input items and activates the enter button 38, whereby reservation setups such as a recording reservation, a reservation of operation, etc. are remotely carried out for the selected device as will be described later.

In addition, as to this manual input screen, an image eh which is about one quarter the agent's head is displayed in the lower left corner of the display screen 20. The image eh of this agent's head is displayed looking the agent's head from behind. Thus, the user who is looking at the whole display screen 20 may be provided with an apparently interesting image in which the agent is looking at the manual input screen.

An image 21g of the jog dial 21 as described above with reference to FIG. 5, an image 22Lg of the left key 22L, an image 22Rg of the right key 22R, an image 23Lg of the left soft key 23L, and an image 23Rg of the right soft key 23R are displayed in the lower domain of the manual input screen. While letters "return" on the image 23Lg of the left soft key 23L and letters "place" on the image 23Rg of the right soft key 23R are displayed in the lower domain of the manual input screen.

This indicates that when the left soft key 23L is depressed, the display screen is changed to the image of the room in which its "reservation setup/apparatus operation" item is installed.

It also indicates that when the right soft key 23R is depressed, a currently held data is pasted (i.e. placed) to each item of the manual input screen.

In particular, when the user selects a desired program from an electronic program guide, for example, and issues instructions to maintain (i.e. hold) of the data of the desired program, the CPU of the portable phone device 9 temporarily stores and controls each data such as a "broadcast date", a "broadcast start time", a "broadcast end time", a "program title", and a "broadcast channel", which are data of the desired program.

During the storing and controlling of the data, the CPU of the portable phone device 9 controls and displays, on the display screen 20, an animation image in which the agent walks close to the electronic program guide installed in the room and takes up (hold) a ball lighting from the electronic program guide with both hands. In this case, the ball lighting taken up by the agent indicates the data of the desired program which is instructed to be "held" by the user. Thus, by displaying such an animation image, the fact that the portable phone device 9 is performing the process to "hold" as instructed by the user may be visually and sensuously recognized by the user.

Next, when the "place" is specified, the portable phone device 9 respectively pastes the "broadcast date", the "broadcast start time", the "broadcast end time", the "program title", and the "broadcast channel" to the "date and time", the "start time", the "end time", the "title", and the "channel" on the manual input screen.

As described above, each information data dealt with by the system is written based on the XML format. Therefore, the data obtained from the electronic program guide may be pasted to the manual input screen of the programmed recording, for example, so that the data may be handled seamlessly among the information processes (among different systems).

In the case of the paste process, the CPU of the portable phone device 9 controls and displays the animation image in which the agent walks close to the personal computer apparatus installed in the room and the agent puts the ball lighting with both hands to the display screen 20 with respect to the personal computer apparatus. As described above, the ball lighting taken up by the agent indicates the data of the desired program which is instructed to be "held" by the user. Thus, by displaying such an animation image, the fact that the portable phone device 9 is performing the process to "hold" as instructed by the user may be recognized by the user visually and sensuously.

In this way, the animation display in which the agent takes up the ball lighting from the predetermined item, and puts it on the specified item is performed among other items.

Next, on the manual input screen, a set up list display instruction button 35 is displayed with which the user specifies a display of the set up list. When specifying the display of the set up list, the user activates the button 35. Thus, the list display screen of the set up list as shown in FIG. 10B is displayed on the display screen 20.

As to the list display screen as shown in FIG. 10B, in addition to the image eh of the agent's head, the set up list is displayed by dividing into pieces by a predetermined period of time, for example, 19:00-21:00, 21:00-23:00, etc., respectively. On detecting the rotation operation of the jog dial 21, the CPU of the portable phone device 9 scrolls and displays the pieces of the set up list according to the rotating direction and an amount of the rotation.

The CPU of the portable phone device 9 controls and displays the set up list of the current day (today) by default. Each time the left key 22L is depressed, the CPU of the portable phone device 9 controls and displays the set up lists of the past, such as for example, the previous day→two days before, . . . , etc., and each time the right key 22R is depressed, the CPU of the portable phone device 9 controls and displays the set up lists after the current day, such as, next day→two days later, etc.

Thus, by rotating the jog dial 21, the user scrolls the set up list to be displayed so as to confirm the set up list on the current day, and depresses the right and left keys 22L and 22R so as to confirm the set up list of the past or after the current day.

In the lower domain of the list display screen, the letters "correction" are displayed together with the image 21g of the jog dial 21, which indicates that the set up list may be corrected by depressing the jog dial 21.

Further, the letters "hold" together with the image 23Rg of the right soft key 23R are displayed, which indicates that when the right soft key 23R is depressed, the selected set up list is temporarily maintained (i.e. held) by the CPU of the portable phone device 9. The user may use the maintained set up list (i.e. time set up information) for remotely controlling the television receiver set 30i, the stereo unit 30b, etc., for example or paste it to the schedule book 30e as a schedule.

The letters "return" are displayed together with the image 23Lg of the left soft key 23L, which indicates that when the left soft key 23L is depressed, the display screen is changed to the manual input screen as shown in FIG. 10A.

Now, a flow chart of FIG. 11 shows a flow of information processing operations of the CPU of the portable phone device 9 when such a "reservation setup/device operation" item is selected.

In the flow chart as shown in FIG. 11, at first in step S21 the CPU of the portable phone device 9 determines whether or not the "reservation setup/device operation" item such as the personal computer apparatus 30a has been selected by the user, and at a time of detecting the selection of the "reservation setup/device operation" item, the information processing step is caused to go to step S22.

In step S22 the CPU of the portable phone device 9 controls and displays the user interface as shown in FIG. 10A with respect to the display screen 20. The user inputs, to the user interface, the "date", the "recording start time", etc. for performing the reservation setup as described above.

Next, the CPU of the portable phone device 9 monitors an operation situation of a key in step S23, step S25, and step S28.

In particular, the CPU of the portable phone device 9, in step S23, determines whether or not the left soft key 23L has been depressed so as to determine whether or not the instructions to "return" the display screen 20 to a previous screen have been issued.

When detecting the depression operation of the left soft key 23L, the CPU of the portable phone device 9 controls and switches the display screen to the image of the room in which its "reservation setup/device operation" item is installed in step S24.

In step S25, the CPU of the portable phone device 9 determines whether or not the enter button 38 has been activated so as to determine whether or not the instructions to perform the reservation setup have been issued.

When detecting the activation of the enter button 38, the CPU of the portable phone device 9, in step S26, transmits each of information data such as the "date", the "start time", the "end time", the "title", the "channel", and "information for specifying device", etc. inputted by the user to mobile server apparatus 11.

The mobile server apparatus 11 transfers each of the received information data together with information data for specifying the user (user specification information) such as the user ID, a user's contractor number, etc., for example, to the control server apparatus 5.

According to the information for specifying the user, the control server apparatus 5 specifies the user and reads the command for a device desired by the user to carry out the reservation setup, the command being stored in the database 19 based on the "information for specifying device." This command is transmitted through the user's domestic network 17 to a corresponding device. Thus, with respect to the desired device, the reservation setup may be performed by remote control.

After completing this reservation setup process, the control server apparatus 5 transmits information (end information) indicating the end of this reservation setup process to the mobile server apparatus 11. The mobile server apparatus 11 transfers the end information to the user's portable phone device 9.

On receiving the end information, the CPU of the portable phone device 9 displays the agent and the message of termination of the reservation setup of "reservation setup completed", etc., in step S27.

By carrying out such control and display, the user may see the display as if the agent were performing the reservation setup representing the user himself or herself, and may be provided with a very interesting user interface.

In step S28, the CPU of the portable phone device 9 determines whether or not the set up list display instruction button 35 has been activated so as to determine whether or not instructions to display the set up list have been issued.

On detecting the activation of the set up list display instruction button 35, the CPU of the portable phone device 9 transmits information indicating that the instructions to display the set up list have been issued to the mobile server apparatus 11. The mobile server apparatus 11 transfers this information together with the user specification information to the decoration server apparatus 6.

On receiving the information indicating that the instructions to display the set up list have been issued, the decoration server apparatus 6 reads the user's set up list stored in the database 8 so as to be transmitted to the mobile server apparatus 11. The mobile server apparatus 11 transfers the set up list to the user's portable phone device 9.

Thus, the CPU of the portable phone device 9 controls and displays the set up list as shown in FIG. 10B on the display screen 20 in step S29.

In addition, while the set up list is being displayed, the CPU of the portable phone device 9 determines whether or not the left soft key 23L has been depressed so as to determine whether or not the instructions to return the display screen 20 to the previous screen have been issued by the user, in step S30. Further, in step S31 it determines whether or not the right soft key 23R has been depressed so as to determine whether or not instructions to temporarily store (hold) the set up list selected by the user have been issued.

On detecting the depression operation of the left soft key 23L, the CPU of the portable phone device 9 controls and switches the display screen 20 to the manual input screen of FIG. 10A. In addition, upon detecting the depression operation of the right soft key 23R, the set up list selected by the user is temporarily stored and controlled (held).

The temporarily stored and controlled set up list is the information which specifies time, and therefore may be used seamlessly among information processes, for example, for the schedule book, the reservation setup of other apparatuses, etc.

A flow chart of FIG. 12 shows a flow for performing the reservation setup of other apparatuses using the temporarily held information. In the flow chart of FIG. 12, when the information such as the temporarily stored and controlled set up list is maintained as described above, the process goes to step S42 through step S41.

As described above, the initial screen after the initial setup is exemplified by the image of each room as shown in FIGS. 8A to C. In step S42 the CPU of the portable phone device 9 determines whether or not a desired item has been selected out of the items installed in the room (whether or not any item has been focused). When detecting that the item has been focused, in step S43 the manual input screen of the focused item is displayed and the image 23Rg of the right soft key 23R and the letters "place" are displayed in the lower domain of the manual input screen, for example, as shown in FIG. 10A.

Then, in step S44 the CPU of the portable phone device 9 determines whether or not the right soft key 23R has been depressed and instructions to paste (place) the temporarily held information have been issued.

On detecting the depression operation of the right soft key 23R, the CPU of the portable phone device 9, in step S45, determines whether or not the currently and temporarily held information meets data requirements necessary for the item selected by the user. When it is determined that the data requirements are satisfied, the temporarily held information is pasted to the manual input screen.

After the paste process, at the time of detecting the operation of the enter button 38 in step S25 of the flow chart of FIG. 11, the CPU of the portable phone device 9 performs the reservation setup for the device selected by the user in step S46 (or step S26 of FIG. 11) of the flow chart of FIG. 12, and notifies the user, via the agent, of the completion of the reservation setup in step S47 (step S27 of FIG. 11).

Although not shown in FIGS. 10A and 10B, when there is the temporarily held information, the CPU of the portable phone device 9 displays the button "place" together with a button "use" for issuing instructions to use the temporarily held information. In step S48 of the flow chart of FIG. 12, the CPU of the portable phone device 9 has determined whether or not the instructions to use the temporarily held information have been issued by the user, so that the process is moved to step S21 of the flow chart of FIG. 11 at the time when the instructions to use it are issued and a routine of the step S21 to step S32 is performed.

[Information Acquisition/Display Process]

Figures 13A, 13B:
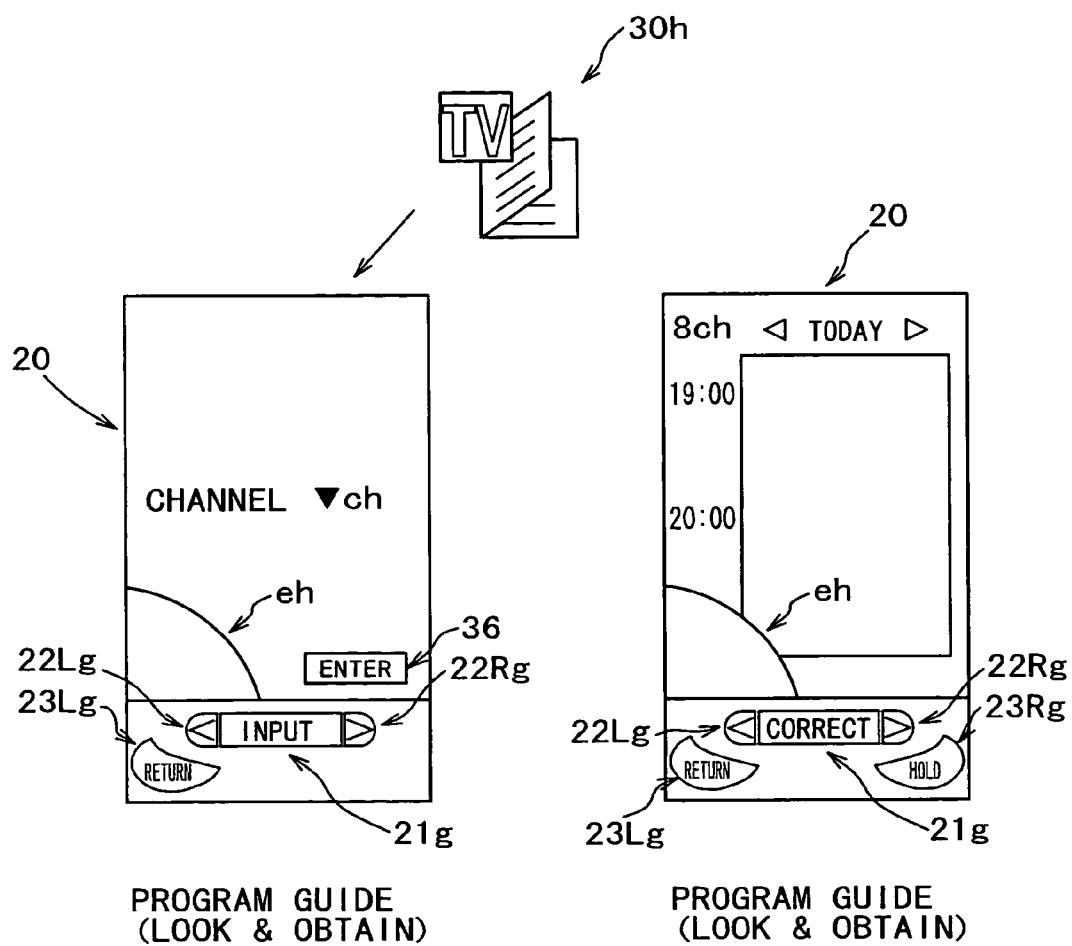
FIGS. 13A and 13B are views showing an example of the user interface to be displayed when an information item is selected by the user.

Next, FIGS. 13A and 13B show an example of the user interface displayed when the information items, such as the electronic program guide, are selected as items. Among these, FIG. 13A shows the manual input screen into which the user manually inputs a data of a desired channel. FIG. 13B shows the display screen of the program table of the channel selected by the user.

As to the manual input screen as shown in FIG. 13A, the image eh of the agent's head as well as the input domain of the desired channel and the enter button 36 for specifying the display of the program table of the inputted channel are displayed. Further in the lower domain of the manual input screen, letters "input" together with the image 21g of the jog dial 21 are displayed and the letters "return" together with the image 23Lg of the left soft key 23L are displayed.

In this case, on detecting the depression operation of the left soft key 23L (return), the CPU of the portable phone device 9 controls and switches the display screen to the image of the room in which the electronic program guide is installed.

On detecting the rotation operation of the jog dial 21, the CPU of the portable phone device 9 displays the channel number to be displayed in the input domain of the channel by switching, for example, "1"→"3"→"4"→"6", . . . , etc., in turn.

By rotating the jog dial 21, the user displays the desired channel number in the input domain of the channel so as to operate the enter button 36. On detecting that the enter button 36 has been activated, the CPU of the portable phone device 9 displays the display screen of the program table of the channel selected by the user as shown in FIG. 13B.

On the display screen of the program table as shown in FIG. 13B, the image eh of the agent's head is displayed, and also letters of the channel number selected by the user (8ch, in this example) and the program table corresponding to the channel number selected by the user are displayed.

With respect to the program table, for example, a program table of the current day (today) is displayed by default, and it may be displayed at the predetermined time intervals such as 19:00-21:00, 21:00-23:00, etc. The program table for each time interval is scrolled and displayed by rotating the jog dial 21.

The CPU of the portable phone device 9 controls and displays the program table of the current day by default. Each time the left key 22L is depressed, it displays and controls program tables of the past, like the previous day→two days before, . . . , etc., and each time the right key 22R is depressed, it displays and controls the program tables after the current day, like next day→two days later, . . . , etc.

Therefore, the user rotates the jog dial 21 so as to scroll the displayed program table and check the program table of the current day, and depresses the right and left keys 22L and 22R so as to check the program table before or after the current day.

In addition, the CPU of the portable phone device 9 controls and displays the image 21g of the jog dial 21 and the respective images 22Lg and the 22Rg of the right and left keys 22L and 22R in the lower domain of the display screen of the program table as shown in FIG. 13B, and controls and displays the letters "return" together with the image 23Lg of the left soft key 23L and also the letters "hold" together with the image 23Rg of the right soft key 23R.

On detecting the depression operation of the left soft key 23L (return), the CPU of the portable phone device 9 switches the display screen to the input screen of the desired channel as shown in FIG. 13A, and controls and displays the screen.

On detecting the depression operation of the right soft key 23R (hold), the CPU of the portable phone device 9 temporarily stores and controls each data, such as the "broadcast date", the "broadcast start time", the "broadcast end time", the "program title", the "broadcast channel", etc. which are the data of the program table selected by the user. Each of the temporarily stored data may be seamlessly used for programmed recording input, the schedule, etc. as described above.

Then, a flow chart of FIG. 14 shows a flow of information processing operation of the CPU of the portable phone device 9 when such an information item is selected.

In the flow chart as shown in FIG. 14, at first, in step S51 the CPU of the portable phone device 9 determines whether or not an information item, such as the electronic program guide, has been selected by the user, and causes the information processing step to go to step S52 at the time of detecting the selection of the information item.

In step S52 the CPU of the portable phone device 9 accesses the mobile server apparatus 11 so as to obtain information corresponding to the information item selected by the user.

In the case of obtaining the information, when the input of predetermined information is needed, the CPU of the portable phone device 9 controls and displays the input screen of the information on the display screen 20. Waiting for the input to the input screen, an access to the mobile server apparatus 11 is attempted so as to obtain information, such as the electronic program guide.

In particular, by accessing each predetermined site on the Internet 4, the communications server apparatus 7 as shown in FIG. 1 usually obtains each information data, such as news, a weather report, fortune-telling information, the electronic program guide, etc., for example. The communications server apparatus 7 stores the obtained information in the database 18. When there is an access from a terminal apparatus (for example, personal computer apparatus etc.) other than the mobile devices such as the portable phone device 9, each information data is provided.

In addition, for the mobile devices, the communications server apparatus 7 transmits each information data as mentioned above to the mobile server apparatus 11.

Since each information data obtained from each site on the Internet 4 is formed by generally considering a client terminal apparatus of a high information processing capability, such as personal computer apparatus, there is a possibility that processing of the transmitted information may be held up in the portable phone device 9 if the information is transparently transmitted to the mobile devices such as the portable phone device 9.

Thus, the mobile server apparatus 11 reduces the amount of information of each information data for the personal computer apparatus transmitted from the communications server apparatus 7, for example, by omitting an image, by dropping image information data, or by deleting unnecessary data so as to correspond to the amount of information for the mobile devices and to be stored in the database 31. When there is an access from the mobile devices such as the user's portable phone device 9, the reduced information is transmitted. Therefore, the information for the personal computer apparatus obtained from the site on the Internet 4 may be also used by the mobile devices.

It should be noted that such reduction in the amount of information is carried out so that the mobile server apparatus 11 may cause the information for personal computer apparatus uploaded to the control server apparatus 5, the decoration server apparatus 6, or the communications server apparatus 7 to be viewed by means of the mobile devices such as the portable phone device 9.

Therefore, when the client terminal apparatus is the personal computer apparatus with an information processing capability higher than that of the mobile devices such as the portable phone device 9, each information data is transmitted to the client terminal apparatus, without reducing the amount of information.

Thus, similar information may be displayed on the client terminal apparatus in more detail than that displayed on the portable phone device 9.

Next, when displaying information such as the electronic program guide, the CPU of the portable phone device 9 controls and displays the letters "return" together with the image 23Lg of the left soft key 23L as well as the letters "hold" together with the image 23Rg of the right soft key 23R as shown in FIG. 13B.

In step S53, on detecting the depression operation of the left soft key 23L (return), the CPU of the portable phone device 9 switches the display screen 20 to the input screen of the desired channel as shown in FIG. 13A, and controls and displays the screen in step S54.

In step S55, on detecting the depression operation of the right soft key 23R (hold), the CPU of the portable phone device 9 temporarily stores and controls each data, such as the "broadcast date", the "broadcast start time", the "broadcast end time", the "program title", and the "broadcast channel" of the electronic program guide selected by the user, for example. Each of the temporarily stored data may be seamlessly used for the programmed recording input and a schedule setup, etc. as described above.

Thus, the acquisition (obtention) of information may be carried out at the time when the user selects the information item. It is also possible to perform the setup so that information may be obtained at a specified time.

Figure 15:
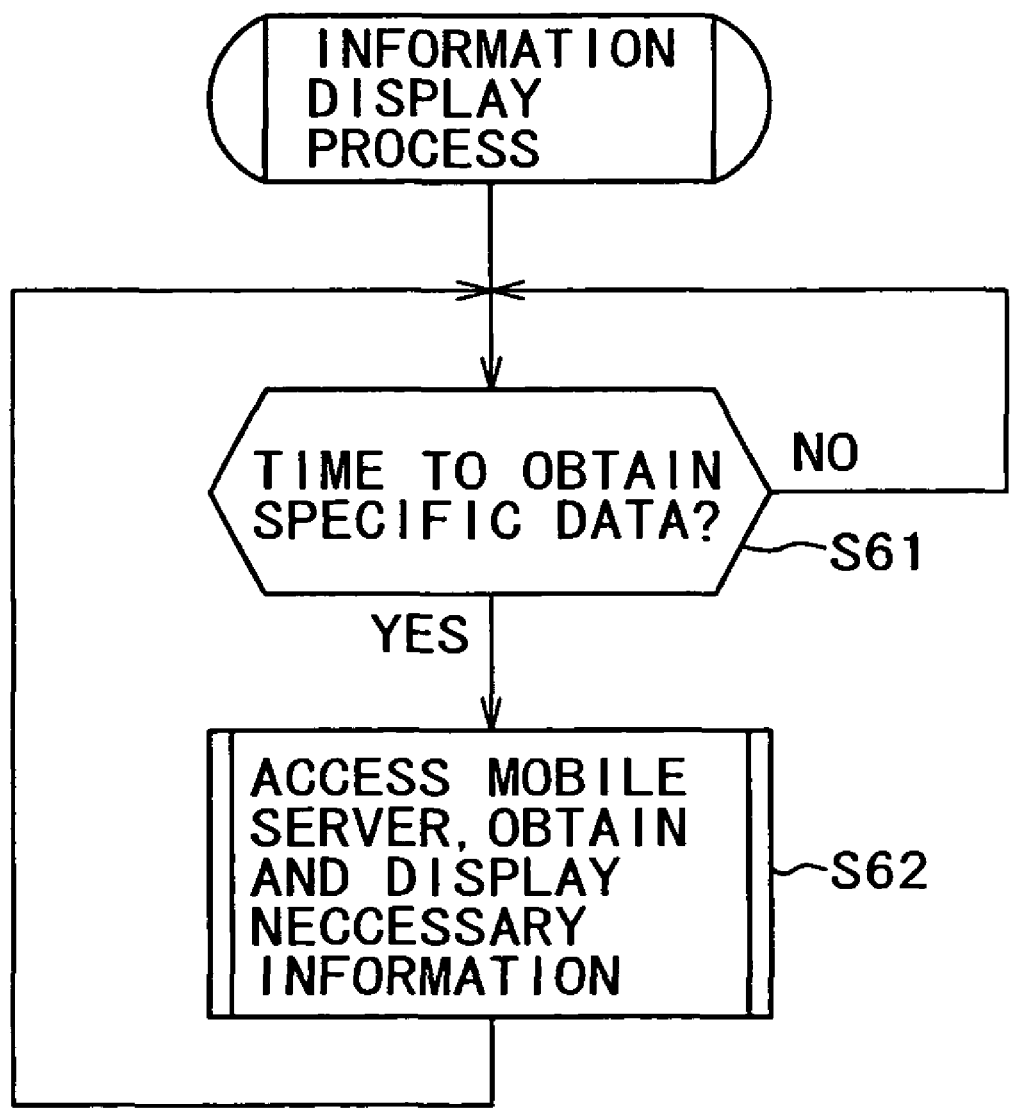
FIG. 15 shows a flow chart showing a flow of an information acquisition processes in case a time to obtain information is set up by the user.

FIG. 15 is a flow chart showing a flow of information acquisition processes in case a time to obtain (acquire) information is set up by the user.

In step S61 of FIG. 15, the CPU of the portable phone device 9 determines whether or not it is the time set up by the user to obtain information, based on the current time clocked by a built-in timer.

When it is the time set up by the user to obtain of the information, the portable phone device 9 operates independently to attempt to access the mobile server apparatus 11 so as to obtain the information.

Thus, according to the set up time to obtain the information, it is possible to obtain the information periodically or in one-shot and automatically.

[Programmed Recording/Device Operation Process of Item with Timer Function]

Next, FIGS. 16A and 16B show an example of the user interface displayed when items having the timer function, such as the television receiver set 30i and the stereo unit 30b are selected. Among these, FIG. 16A is a manual input screen where the user performs timer setup input by manual input, and FIG. 16B is a display screen which displays the timer list set up by the user.

With respect to the manual input screen as shown in FIG. 16A, letters "operate right now" for issuing instructions to operate the device immediately together with the image eh of the agent's head, "ON button 37a" for specifying ON operation of the power supply of the device, and "OFF button 37b" for specifying OFF operation of the power supply of the device are displayed.

With respect to the manual input screen, an input domain for a "start date of operation", a "start time of operation", a "end time of operation", and a "specified channel", the "enter button 38" for specifying the determination of each inputted item, and a "list display button 39" for specifying the display of a set up timer list are displayed.

Further, in the lower domain of this manual input screen, the letters "input" are displayed together with the image 21g of the jog dial 21, the letters "return" are displayed together with the image 23Lg of the left soft key 23L, and the letters "place" are displayed together with the image 23Rg of the right soft key 23R.

When the user wishes to start a desired apparatus immediately, he or she activates the ON button 37a displayed on the display screen 20. On detecting the activation of the ON button 37a, the CPU of the portable phone device 9 transmits, to the mobile server apparatus 11, the information for specifying a device, information which shows the ON activation of the power supply, information which shows the desired channel to be selected, etc. The mobile server apparatus 11 transfers each of these information data together with the user ID of the user etc. to the control server apparatus 5. The control server apparatus 5 authenticates the user based on the user ID etc. Based on the information for specifying the device, the control server apparatus 5 reads the command to specify the ON operation of the power supply of the device from the database 19. Based on the information indicating the desired channel to be selected, the control server apparatus 5 reads the command for selecting the channel from the database 19. The thus read commands are supplied to corresponding devices through the domestic network 17 of the authenticated user. Thus, the desired device may be turned ON to operate in real time by remote control.

On the other hand, when it is desired to turn the desired device off immediately, the user activates the OFF button 37b. On detecting the activation of the OFF button 37b, the CPU of the portable phone device 9 transmits the information for specifying the device, information which shows the OFF activation of the power supply, etc. to the mobile server apparatus 11. The mobile server apparatus 11 transfers each of these information data together with the user ID of the user etc. to the control server apparatus 5. The control server apparatus 5 authenticates the user based on the user ID etc. Based on the information for specifying the device, the command which specifies the OFF operation of the power supply of the device is read out of the database 19 so as to supply the command to the corresponding device through the domestic (home) network 17 of the authenticated user. Thus, the OFF operation of the desired device may be carried out in real time by remote control.

When manually inputting the timer setup through the manual input screen, the user rotates and depresses the jog dial 21 so as to perform the manual input. In particular, when the jog dial 21 is depressed at first in a status where the manual input screen is displayed, the CPU of the portable phone device 9 is turned into an input mode for "year". When the jog dial 21 is rotated upward at the time of the input mode for "year", the CPU controls and displays the years to be set up in turn by incrementing by one year, like 2002 year→2003 year→2004 year→2005 year, etc. In addition, when the jog dial 21 is rotated downward, the CPU controls and displays the years to set up in turn by decrementing by one year, like 2005 year→2004 year→2003 year→2002 year, etc.

The user rotates the jog dial 21 so as to display a desired set up year. When the desired set up year is displayed, the jog dial 21 is depressed. On detecting the depression operation, the CPU temporarily controls and stores the currently displayed set up year, and moves the input mode for "year" to an input mode for "month."

When the rotation operation of the jog dial 21 is carried out upward at the time of an input mode for "month", the CPU controls and displays the month in turn by incrementing the month to be set up by one month, such as for example, January→February→March→April, . . . , etc. When the jog dial 21 is rotated downward, the CPU controls and displays the month to be set in turn up by decrementing by one month, for example, April→March→February→January, . . . , etc.

The user rotates the jog dial 21 so as to display the desired set up month. When the desired set up month is displayed, the jog dial 21 is depressed. On detecting the depression operation, the CPU temporarily controls and stores the set up month currently displayed and moves from the input mode for "month" to the input mode for "day."

If the jog dial 21 is rotated upward in the input mode for "day", the CPU controls and displays the set up date in turn by incrementing by one day, for example, the first day→the second day→the third day→the fourth day, . . . , etc. When the jog dial 21 is rotated downward, the CPU controls and displays the day to be set up in turn by decrementing by one day, for example, 31st day→30th day→29th day→28th day, etc.

The user rotates the jog dial 21 so as to display the desired set up date. When the desired set up date is displayed, the user depresses the jog dial 21. On detecting the depression operation, the CPU temporarily stores and controls the currently displayed set up date and moves from the input mode for the "date" to the input mode of "start time (hour)."

When the jog dial 21 is rotated upward in the input mode of the "start time (hour)", the CPU controls and displays the start time (hour) to be set up in turn by incrementing by one hour, for example, 0:00→1:00→2:00→3:00, and so on. In addition, when the jog dial 21 is rotated downward, the CPU controls and displays the start time (hour) to be set up in turn by decrementing by one hour, for example, 24:00→23:00→22:00→21:00, etc.

The user rotates the jog dial 21 so as to display the desired start time (hour). When the desired start time (hour) is displayed, the user depresses the jog dial 21. On detecting the depression operation, the CPU temporarily controls and stores the currently displayed start time (hour) and moves from the input mode of the "start time (hour)" to the input mode of "start time (minute)."

By rotating and depressing the jog dial 21 in this way, the user manually inputs the "date", the "start time", the "end time", and the "channel" so as to set up the timer, and activates the enter button 38 when the input is completed. On detecting the activation of the enter button 38, the CPU of the portable phone device 9 controls and stores the inputted timer set up information, and transmits the timer set up information, the information for specifying the device in which the timer is set up, etc. to the mobile server apparatus 11. The mobile server apparatus 11 transfers each of these information data together with the user ID of the user etc. to the control server apparatus 5. Based on user ID etc., the control server apparatus 5 authenticates the user. Based on the information for specifying the device, a command which specifies the timer setup of the device is read out of the database 19 and supplied to the corresponding device through the domestic network 17 of the authenticated user. Thus, the timer setup may be carried out by remote control for the desired device.

When the timer setup is performed based on the program table, the user holds the data of the desired channel from the program table as described above, and depresses the right soft key 23R (place), so that respective data of the "broadcast date", the "broadcast start time" and the "broadcast end time" and the "broadcast channel" which are stored (held) are respectively pasted to input domains of the "start date of operation", the "start time of operation", the "end time of operation", and the "specified channel" in the manual input screen. Thus, the data of the program table can be seamlessly used by remote control.

When the user wishes to check the set up timer list, he or she activates the list display button 39. On detecting the activation of the list display button 39, the CPU of the portable phone device 9 controls and displays the timer list as shown in FIG. 16B.

In particular, with respect to the display screen of the timer list, the set up timer list, for example, 8:00-10:00, 10:00-12:00, etc. together with the image eh of the agent's head are displayed at the predetermined time intervals.

In the lower domain of the display screen of the timer list, the letters "correction" are displayed together with the image 21*g* of the jog dial 21, the letters "return" are displayed together with the image 23L*g* of the left soft key 23L, and the letters "hold" are displayed together with the image 23R*g* of the right soft key 23R.

When the jog dial 21 is rotated, the timer list is scrolled and displayed. Further, with respect to the timer list, the set up timer list of the current day is displayed by default. Each time the left key 22L is depressed, set up timer lists of the past are displayed, for example, current day→the previous day→two days before, . . . , etc., and each time the right key 22R is depressed, set up timer lists after the current day are displayed, for example, current day→next day→two days later, . . . , etc. The user rotates the jog dial 21 or depresses the right and left keys 22L and 22R so as to check the timer lists.

When correcting timer lists, the user selects a timer list to be corrected and depresses the jog dial 21. On detecting the depression operation of the jog dial 21, the CPU of the portable phone device 9 returns the display screen to the manual input screen of FIG. 16A and displays the currently set up timer list. By means of the manual input as described above, the user changes the numerical value of a part to be the corrected in the displayed timer list so as to correct it.

On detecting the depression operation of the right soft key 23R (hold), the CPU of the portable phone device 9 temporarily controls and stores each data, such as for example, the "start date of operation", the "start time of operation", the "end time of operation", the "specified channel", etc. which are the set up timer lists selected by the user. Each of the temporarily stored data may be seamlessly used for the programmed recording input, the schedule book, etc. as described above.

[Information Control Process]

Figures 17A, 17B:
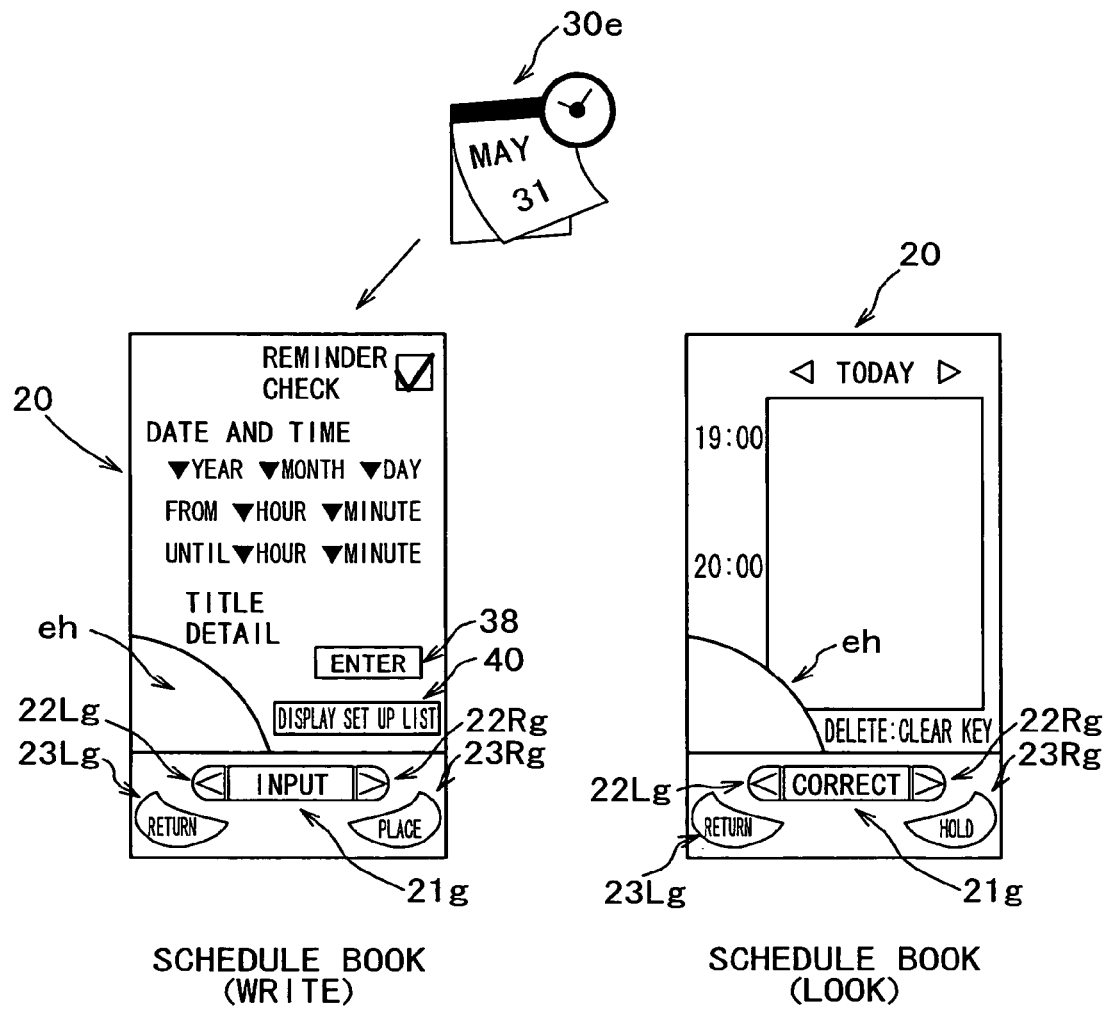
FIGS. 17A and 17B are views showing an example of the user interface to be displayed when an information management item is selected by the user.

FIGS. 17A and 17B show an example of the user interface displayed when information management items, such as schedule book 30*e*, are selected. Among these, FIG. 17A is a manual input screen where the user performs a schedule input (entry) by means of the manual input. FIG. 17B is a display screen which displays a registered schedule.

With respect to the manual input screen shown in FIG. 17A, an input domain of a "schedule date", a "schedule start time", a "schedule end time", a "schedule title", and the "contents of schedule (details)" and the "set up list display button 40" for specifying the display of a set up schedule list is displayed together with the image eh of the agent's head.

Further, in the lower domain of the manual input screen, the letters "input" are displayed together with the image 21*g* of the jog dial 21, the letters "return" are displayed together with the image 23L*g* of the left soft key 23L, and the letters "place" are displayed together with the image 23R*g* of the right soft key 23R.

When manually inputting the desired schedule into the manual input screen, the user rotates and depresses the jog dial 21 so as to perform the manual input. In particular, in the status where the manual input screen is displayed, when the jog dial 21 is depressed at first, the CPU of the portable phone device 9 turns into the input mode for "year." When the jog dial 21 is rotated upward in the input mode for "year", the CPU controls and displays the year to be set up by incrementing by one year in turn, like 2002 year→2003 year→2004 year →2005 year, . . . , etc. In addition, when the jog dial 21 is rotated downward, the CPU controls and displays the year to be set up in turn by decrementing by one year, like 2005 year →2004 year →2003 year →2002 year, . . . , etc.

Such operations are similar to input steps at the time of setting up the timer as described by using FIG. 16. As with the input steps at the time of setting up the timer, the user operates the jog dial 21 so as to manually input the "schedule date", the "schedule start time", and the "schedule end time." When setting up the schedule, if the "schedule end time (minute)" is inputted and the jog dial 21 is depressed, the CPU of the portable phone device 9 shifts to the input mode of the "schedule title."

As to predetermined operation keys, such as numerical keys of the portable phone device 9, one operation key is allocated with several alphabets. The user operates these operation keys so as to input a desired schedule title in alphabet, for example. The CPU of the portable phone device 9 controls and displays the schedule title inputted by the user in a display domain of the "schedule title" of the input screen.

The user checks the title which is controlled and displayed in the display domain of the "schedule title", and depresses the jog dial 21 if no error is found. When the depression operation is carried out, the CPU of the portable phone device 9 shifts to the input mode of the "contents of schedule (details)."

Even in the input mode of the "contents of schedule (details)", the user operates the operation keys so as to input the desired contents of schedule in alphabet, for example. The CPU of the portable phone device 9 controls and displays the contents of schedule inputted by the user in the display domain of the "contents of schedule (details)" of the input screen.

The user checks the contents of schedule which are controlled and displayed in the display domain of the "contents of schedule (details)", and depressed the jog dial 21 if no error is found. When the depression operation is carried out, the CPU of the portable phone device 9 controls and stores the "schedule date", the "schedule start time", the "schedule end time", the "schedule title", and "contents of schedule (details)" which are inputted by the user and transmits each of the information data to the mobile server apparatus 11.

The mobile server apparatus 11 transfers each of the information data together with the user ID of the user etc. to the decoration server apparatus 6. The decoration server apparatus 6 performs the user authentication based on the user ID etc. The "schedule date", the "schedule start time", the "schedule end time", the "schedule title", and the "contents of schedule (details)" which are transferred are controlled and stored in the storage area, provided in the database 8, of the user's schedule book. Thus, the schedule inputted by the user is stored in the user's portable phone device 9 and may be uploaded to the decoration server apparatus 6.

It should be noted that when the left soft key 23L (return) is depressed at the time of displaying the manual input screen which performs the schedule input (entry), the CPU of the portable phone device 9 returns the display of the display screen to the image of the room in which the schedule book is installed.

When the data of the desired channel from the program table is held, the user depresses the right soft key 23R (place). Thus, the CPU of the portable phone device 9 pastes respective data of the "broadcast date", the "broadcast start time", the "broadcast end time", the "program title" and a "broadcast channel" which have been stored (maintenance) to respective input domains of the "schedule date", the "schedule start time", the "schedule end time", the "schedule title", and the "contents of schedule (detailed)" in the manual input screen, whereby the data of the program table may be seamlessly applied to the schedule book.

When the user wishes to check the set up timer list, he or she activates the set up list display button 40. When detecting the activation of the set up list display button 40, the CPU of the portable phone device 9 controls and displays the set up schedule list as shown in FIG. 17B.

In particular, with respect to the display screen of the schedule list, a set up schedule list together with the image eh of the agent's head is displayed at predetermined time intervals, like 19:00-21:00, 21:00-23:00, etc.

The letters "correction" are displayed together with the image 21g of the jog dial 21, the letters "return" are displayed together with the image 23Lg of the left soft key 23L, and the letters "hold" are displayed together with the image 23Rg of the right soft key 23R in the lower domain of the display screen of the schedule list.

This schedule list may be scrolled and displayed when the jog dial 21 is rotated by the user. Further, with respect to the timer list, the set up schedule list of the current day (today) is displayed by default, for example. Each time the left key 22L is depressed by the user, the set up schedule lists of the past are displayed, like the current day→the previous day→two days before, . . . , etc. Each time the right key 22R is depressed, the set up schedule lists after the current day are displayed, like the current day→next day→two days later, . . . , etc. The user checks the schedule lists by rotating the jog dial 21 or depressing the right and left keys 22L and 22R.

In the case of correcting the schedule list, the user selects a schedule to be corrected and depresses the jog dial 21. On detecting the depression operation of the jog dial 21, the CPU of the portable phone device 9 returns the display screen to the manual input screen as shown in FIG. 17A and displays the currently set up schedule. The user corrects a part to be corrected of the displayed schedule by changing as described above by manual input.

On detecting the depression operation of the right soft key 23R (hold), the CPU of the portable phone device 9 temporarily stores and controls each data, such as the "schedule date", the "schedule start time", the "schedule end time", and the "schedule title", etc., for example, which are the set up schedules selected by the user. Each of the temporarily stored data may be seamlessly used for the programmed recording input etc.

Figure 18:
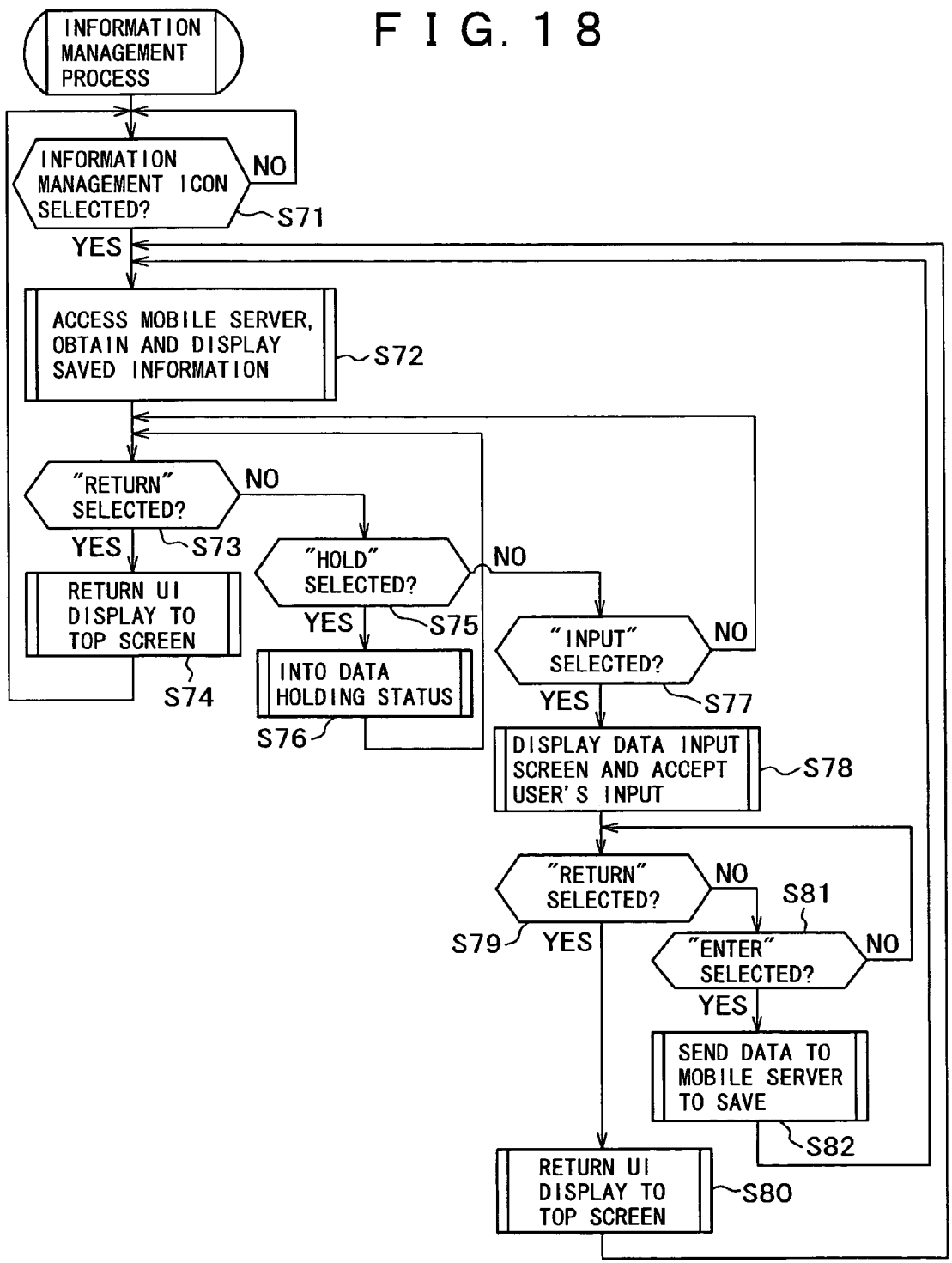
FIG. 18 shows a flow chart showing a flow of the information processing operations of the portable phone device when the information management item is selected by the user.

Next, in a flow chart of FIG. 18 there is shown a flow of information processing operations of the CPU of the portable phone device 9 when such an information management item is selected.

In the flow chart as shown in FIG. 18, at first in step S71 the CPU of the portable phone device 9 determines whether or not the information management items, such as the schedule book 30e, are selected by the user and causes the information processing step to go to step S72 at a time of detecting the selection of the information management item.

In step S72 the CPU of the portable phone device 9 accesses the mobile server apparatus 11 so as to obtain and display information on the user's information management item which is stored in the database 31 of this mobile server apparatus 11.

In addition, the information on the information management item is also stored in the database 8 of the decoration server apparatus 6, while the information on the information management item stored in the database 31 of the mobile server apparatus 11 is reduced in the amount of information for mobile devices.

Next, the CPU of the portable phone device 9 monitors an operation status of a key in step S73, step S75, and step S77.

In particular, in step S73 the CPU of the portable phone device 9 determines whether or not the left soft key 23L has been depressed so as to determine whether or not the instructions to "return" the display screen 20 to the previous screen have been issued.

At the time of displaying the manual input screen as shown in FIG. 17A, when detecting the depression operation of the left soft key 23L, the CPU of the portable phone device 9 controls and switches the display screen to the image of the room in which the information management item is installed, in step S74.

In step S75, the CPU of the portable phone device 9 determines whether or not the enter button 38 has been operated so as to determine whether or not the reservation setup has been specified.

At the time of displaying the timer list as shown in FIG. 17B, when detecting the depression operation of the right soft key 23R, in step S76, the CPU of the portable phone device 9 temporarily controls and stores each data, such as the "schedule date", the "schedule start time", the "schedule end time", the "schedule title", etc. which are the set up schedules selected by the user. Each of the temporarily stored data may be seamlessly used for the programmed recording input etc.

In step S77, the CPU of the portable phone device 9 determines whether or not the jog dial 21 has been depressed so as to determine whether or not the input of the schedule has been specified.

At the time of displaying the manual input screen as shown in FIG. 17A when detecting the depression operation of the jog dial 21, in step S78, the CPU of the portable phone device 9 accepts the input of each data, such as the "schedule date", the "schedule start time", the "schedule end time", the "schedule title", etc. which are inputted by the user.

While the manual input screen is being displayed, in step S79 the CPU of the portable phone device 9 determines whether or not the left soft key 23L has been depressed so as to determine whether or not the instructions to "return" the display screen 20 to the previous screen have been issued by the user. In step S81, it is determined whether or not the enter button 38 as shown in FIG. 17A has been activated so as to determine whether or not the process of the schedule inputted by the user has been specified.

On detecting the depression operation of the left soft key 23L, the CPU of the portable phone device 9 returns the display screen to the image of the room in which the information management item is installed, in step S80. On detecting the activation of the enter button 38, each data of the schedule inputted by the user is transmitted to mobile server apparatus 11.

While saving each data of the schedule in the database 31, the mobile server apparatus 11 transmits it to the decoration server apparatus 6. The decoration server apparatus 6 saves the data of the schedule in the database 8. Thus, by accessing the decoration server apparatus 6 from the personal computer apparatus, it becomes possible to check the schedule set up by the portable phone device 9 by means of the personal computer apparatus (and correction and a setup).

Figure 19:
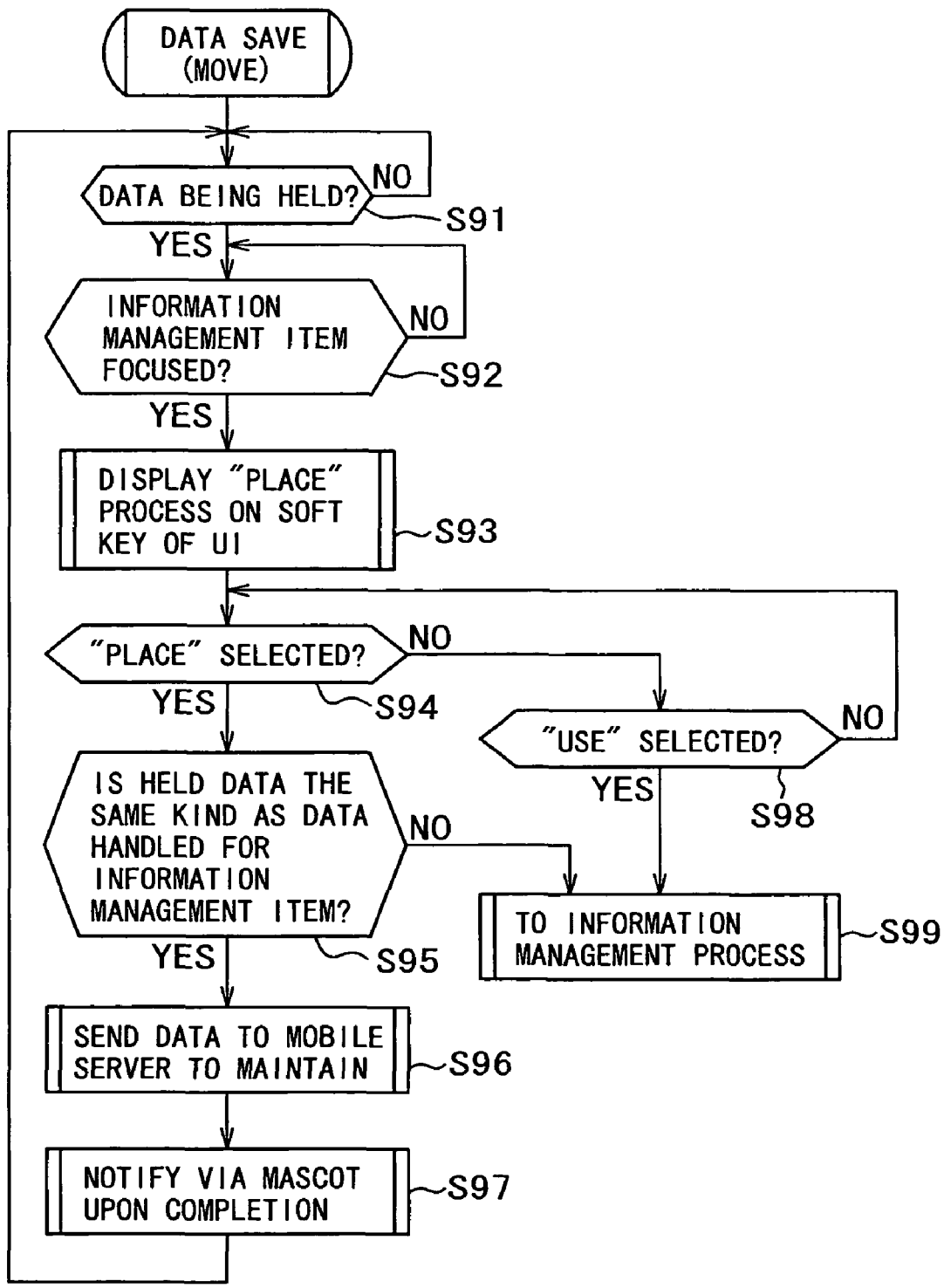
FIG. 19 shows a flow chart showing a flow in which the temporarily held information is pasted to the information management item.

Now, a flow chart of FIG. 19 shows a flow in which the temporarily held information is pasted to the information management items, such as the schedule book. In the flow chart of FIG. 19, for example, when data such as the electronic program guide is held, the process goes to step S92 through step S91.

As described above, with respect to the initial screen after the initial setup, the image of each of the rooms as shown in FIGS. 8A to 8C is displayed. In step S92 the CPU of the portable phone device 9 determines whether or not a desired item has been selected out of the items installed in the room (whether or not any item has been focused). When detecting that the item has been focused, in step S93 the manual input screen of the item which has been focused is displayed, while the image 23Rg of the right soft key 23R and the letters "place" are displayed in the lower domain of the manual input screen as shown in FIG. 17A, for example.

Then, in step S94 the CPU of the portable phone device 9 determines whether or not the right soft key 23R has been depressed and the paste process (place) of the temporarily held information has been specified.

On detecting the depression operation of the right soft key 23R, the CPU of the portable phone device 9, in step S95, determines whether or not the currently and temporarily held information satisfies data requirements with respect to the item selected by the user. When it is determined that the data requirements are fulfilled, the temporarily held information is pasted to the manual input screen.

After completing the paste process, the CPU of the portable phone device 9 transmits the pasted data as the schedule data to the mobile server apparatus 11 at a time of detecting the activation of the enter button 38, in step S96, while the user is notified of the completion of schedule registration through the agent in step S97.

Although not shown in FIGS. 17A and 17B, when the temporarily held information exists, the CPU of the portable phone device 9 displays, together with the button "place", the button "use" for issuing the instructions to use the temporarily held information. In step S98 of the flow chart of FIG. 19, the CPU of the portable phone device 9 has determined whether or not the instructions to employ (use) the temporarily held information have been issued by the user. At a time when the use is instructed, the process is moved to step S71 of the flow chart of FIG. 18, the routine of the step S71 through step S82 are performed.

[In Case Scrapbook is Selected as Information Management Item]

When the scrapbook 30f is selected by the user as the information management item, the CPU of the portable phone device 9 displays the input screen of the user ID and the password, based on the application program. When the user inputs the user ID and the password, the CPU of the portable phone device 9 transmits information indicating that the scrapbook 30f is selected together with the inputted user ID and password to the mobile server apparatus 11.

The mobile server apparatus 11 transmits the information indicating that the user ID, the password, and the scrapbook 30f are selected to the decoration server apparatus 6. Based on the transferred user ID and password, the decoration server apparatus 6 carries out the user authentication. When the user is authenticated, data corresponding to the user's scrapbook is read out of the database 8 and sent as a response to the mobile server apparatus 11.

When there are notification information, a message, etc., for example, the decoration server apparatus 6 sends these as information on a bulletin board along with the data corresponding to the scrapbook to the mobile server apparatus 11.

The mobile server apparatus 11 transfers the received data corresponding to the scrapbook etc. to the user's portable phone device 9. The CPU of the user's portable phone device 9 controls and displays the transferred data corresponding to the scrapbook etc. on the display screen 20.

It should be noted that the information on the bulletin board may be formed on the mobile server apparatus 11 side and then transmitted to the user's portable phone device 9 by attaching to the data corresponding to the scrapbook received from the decoration server apparatus 6.

Figures 20A, 20B:
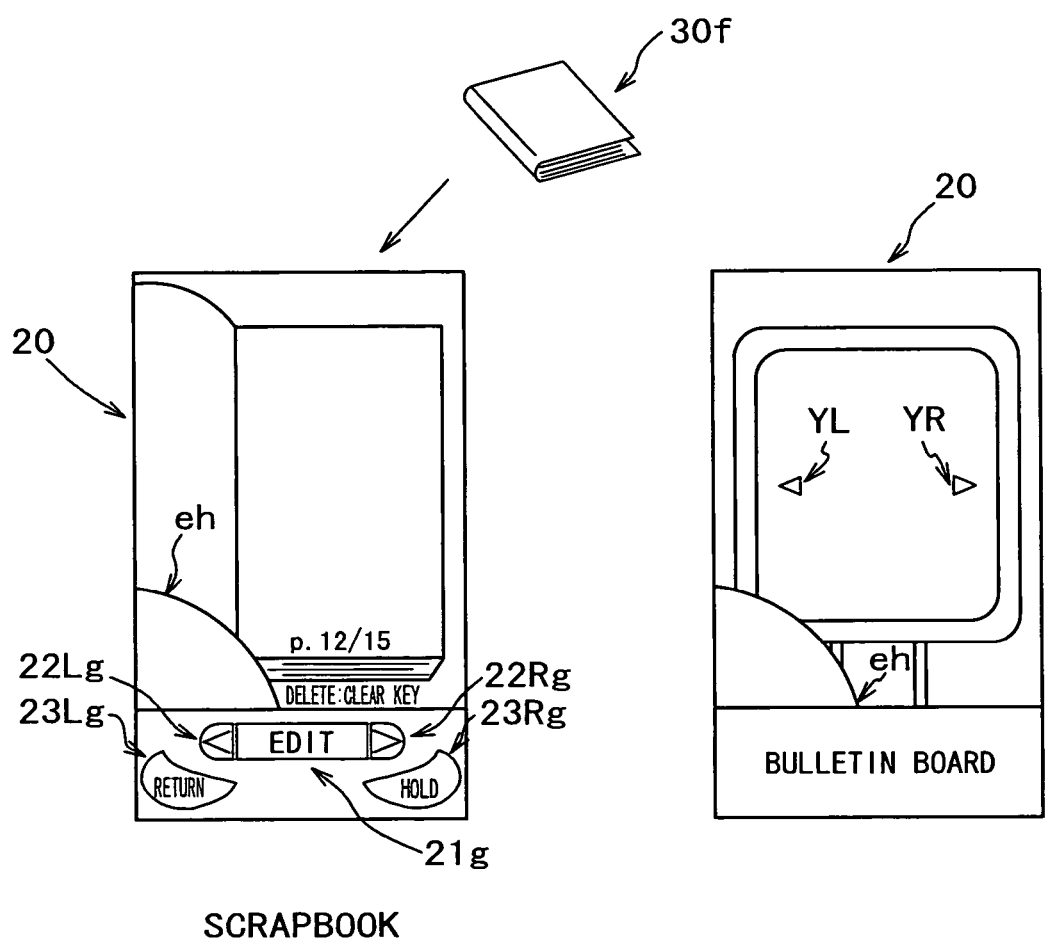
FIGS. 20A and 20B show views showing an example of the user interface to be displayed when a scrapbook is selected by the user as an information management item.

FIG. 20A is a display screen of a user's scrap. FIG. 20B is a display screen of the information on the bulletin board.

With respect to the display screen of each scrap as shown in FIG. 20A, the total number of pages of all scraps and the page number of the currently displayed scrap, for example, 12/15, 11/15, . . . , etc. together with the image eh of the agent's head are displayed. The example as shown in FIG. 20A indicates that the total number of pages of all scraps is 15 and the page number of the currently displayed scrap is 12 (p. 12/15).

Further, in the lower domain of the display screen, letters "edit" are displayed together with the image 21g of the jog dial 21, the letters "return" are displayed together with the image 23Lg of the left soft key 23L, and the letters "hold" are displayed together with the image 23Rg of the right soft key 23R.

When editing the scrap (correction), the user depresses the jog dial 21, whereby the CPU of the portable phone device 9 turns into an edit mode for the currently displayed scrap so that a new scrap is formed with a letter, an image, etc. which are inputted by the user by operating the operation keys. This scrap is transmitted to the decoration server apparatus 6 through the mobile server apparatus 11 and stored in the database 8 as the user's scrap.

On detecting the depression operation of the left soft key 23L (return), the CPU of the portable phone device 9 controls and switches the display screen 20 to the image of the room in which the scrapbook 30f is installed.

As to the display screen of the bulletin board as shown in FIG. 20B, the information on the bulletin board received from the decoration server apparatus 6 (or the mobile server apparatus 11) is displayed together with the image eh of the agent's head. When this information exists over a plurality of pages, the CPU of the portable phone device 9 controls and displays images of arrows corresponding to the existing pages at the left end and (or) the right end on the bulletin board.

The example as shown in FIG. 20B controls and displays the image YL of the leftward arrow at the left end of the bulletin board, and displays the image YR of the rightward arrow at the right end of the bulletin board, which shows that the image YL of the leftward arrow indicates that there is a previous page before the current page and the image YR of the rightward arrow indicates that there is a next page after the current page.

The images YL and YR of the right and left arrows respectively correspond to the right and left keys 22L and 22R, so that the user may depress the right and left keys 22L and 22R so as to display a desired page of the information on the bulletin board.

[In Case Message Function (E-mail Function) is Selected]

When the message function 30g is selected, the CPU of the portable phone device 9 displays a selection screen for choosing either "addition to message address list", "transmit message", or "receive message" on the display screen.

[Add to Message Address List]

Figures 21A, 21B:
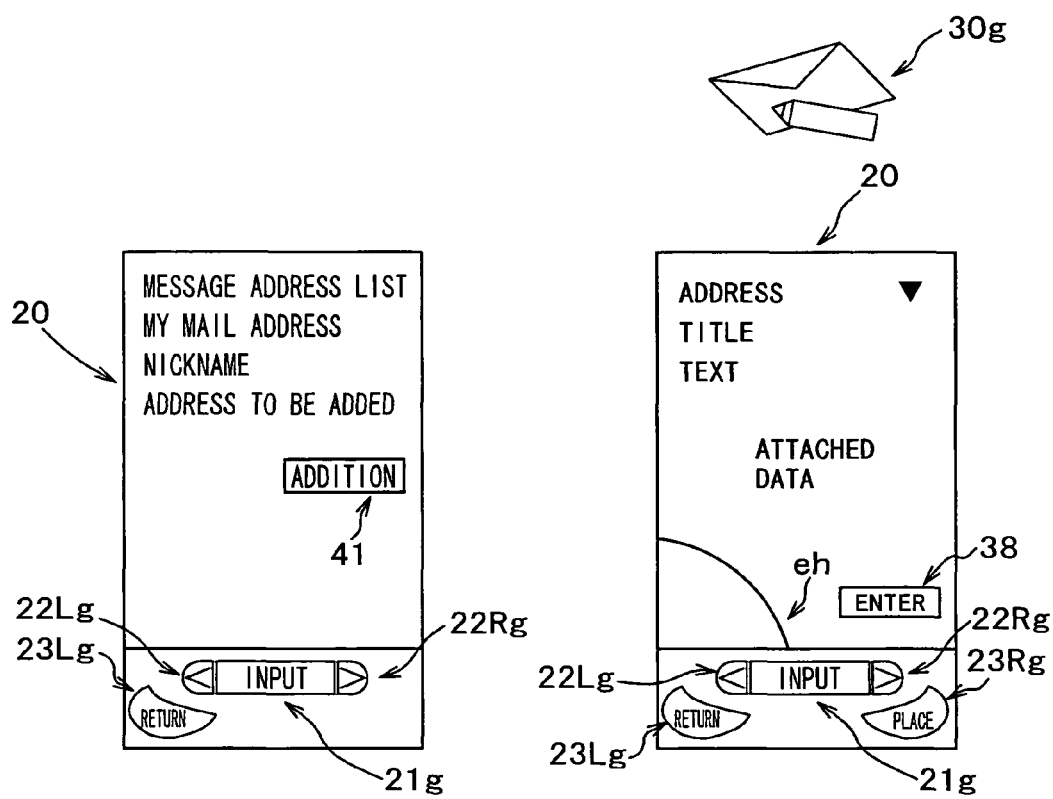
FIGS. 21A and 21B are views showing an example of the user interface to be displayed when an addition to a message address list is specified by the user and an example of the user interface to be displayed when transmission of a message is specified.

When the "addition to message address list" is selected from the selection screen, the input screen in which a destination is added to a message address list, as shown in FIG. 21A, is displayed.

In particular, an input column for a transmitter's own e-mail address, an input column for the destination name (nickname) to be added to the message address list, an input column for the e-mail address of the destination, and an addition button 41 which specifies an addition to the message address list are displayed as the input screen.

In the lower domain of the display screen 20, the letters "input" are displayed together with the image 21g of the jog dial 21, and the letters "return" are displayed together with the image 23Lg of the left soft key 23L.

When the left soft key 23L among these is depressed, the CPU of the portable phone device 9 returns the display screen 20 to the image of the room in which the message function 30g is installed.

On the other hand, when the jog dial 21 is depressed first, the CPU of the portable phone device 9 moves to "input mode of my mail address." Subsequently, each time the jog dial 21 is depressed, it shifts "input mode of my mail address"→"input mode of nickname (or destination name) "→"input mode of mail address (mail address of destination) to be added" one by one.

By depressing the jog dial 21 and performing an input operation by means of the operation keys, the user inputs his or her mail address, nickname, and a mail address to be added (the mail address of the destination). When the input in each input column is completed, the addition button 41 is activated.

On detecting the activation of the addition button 41, the CPU of the portable phone device 9 controls and stores the nickname and the mail address of the destination in the message address list provided in the internal memory of the portable phone device 9. While, the CPU of the portable phone device 9 transmits, to the mobile server apparatus 11, each information data of his or her own mail address, nickname, and mail address to be added which are thus inputted.

The message address list of each user is stored in the database 31 of the mobile server apparatus 11. On receiving the each information data, the mobile server apparatus 11 refers to the message address list of the user stored in the database 31, based on the user's mail address (my mail address), so as to check the list as to whether the mail address to be added does not overlap with another address, for example. When it is determined that the addition of the mail address is satisfactory, the "nickname (or destination name)" and the "mail address of the destination" are added to the message address list of the user who has transmitted the each information data.

It should be noted that, in this example, it is assumed that the message address list is stored in the database 31 of the mobile server apparatus 11, however, this message address list may be stored in the database 8 of the decoration server apparatus 6 or may be stored in both the database 31 of mobile server apparatus 11 and the database 8 of the decoration server apparatus 6.

[Transmission of Message]

When the "transmission of message" is selected from the selection screen, the CPU of the portable phone device 9 controls and displays an input screen of message as shown in FIG. 21B.

In particular, as to the input screen of this message, in addition to the image eh of the agent's head, an input column for the "destination name (address)", an input column for a "title of message", an input column for a "message (text)", an input column for an "attached data", such as an image and a sound, for example, and the enter button 38 which specifies transmission of the message are displayed.

In the lower domain of the input screen of the message, the letters "input" are displayed together with the image 21g of the jog dial 21, the letters "return" are displayed together with the image 23Lg of the left soft key 23L, and the letters "place" are displayed together with the image 23Rg of the right soft key 23R.

On detecting the depression operation of the left soft key 23L (return) among these, the CPU of the portable phone device 9 returns the display screen to the destination name input screen as shown in FIG. 21A.

On detecting the first depression operation of the jog dial 21, the CPU of the portable phone device 9 moves to the "input mode of address (e-mail address)", subsequently, each time the depression operation of the jog dial 21 is detected, it moves the input mode in order of an "input mode of title"→an "input mode of text"→an "input mode of attached data."

By depressing the jog dial 21 and performing the input operation by means of the operation keys, the user inputs the address, the title, the text, and the attached data.

For example, in case information such as an image is temporarily stored by means of the information process of the "hold", if the depression operation of the right soft key 23R (place) is detected, the CPU of the portable phone device 9 pastes the information such as the temporarily stored image to the message as the attachment data.

Next, when the user activates the enter button 38 and issues instructions to transmit the thus created message, the CPU of the portable phone device 9 transmits the message to the mobile server apparatus 11, whereby the message created by the user may be transmitted to the destination.

Figure 22:
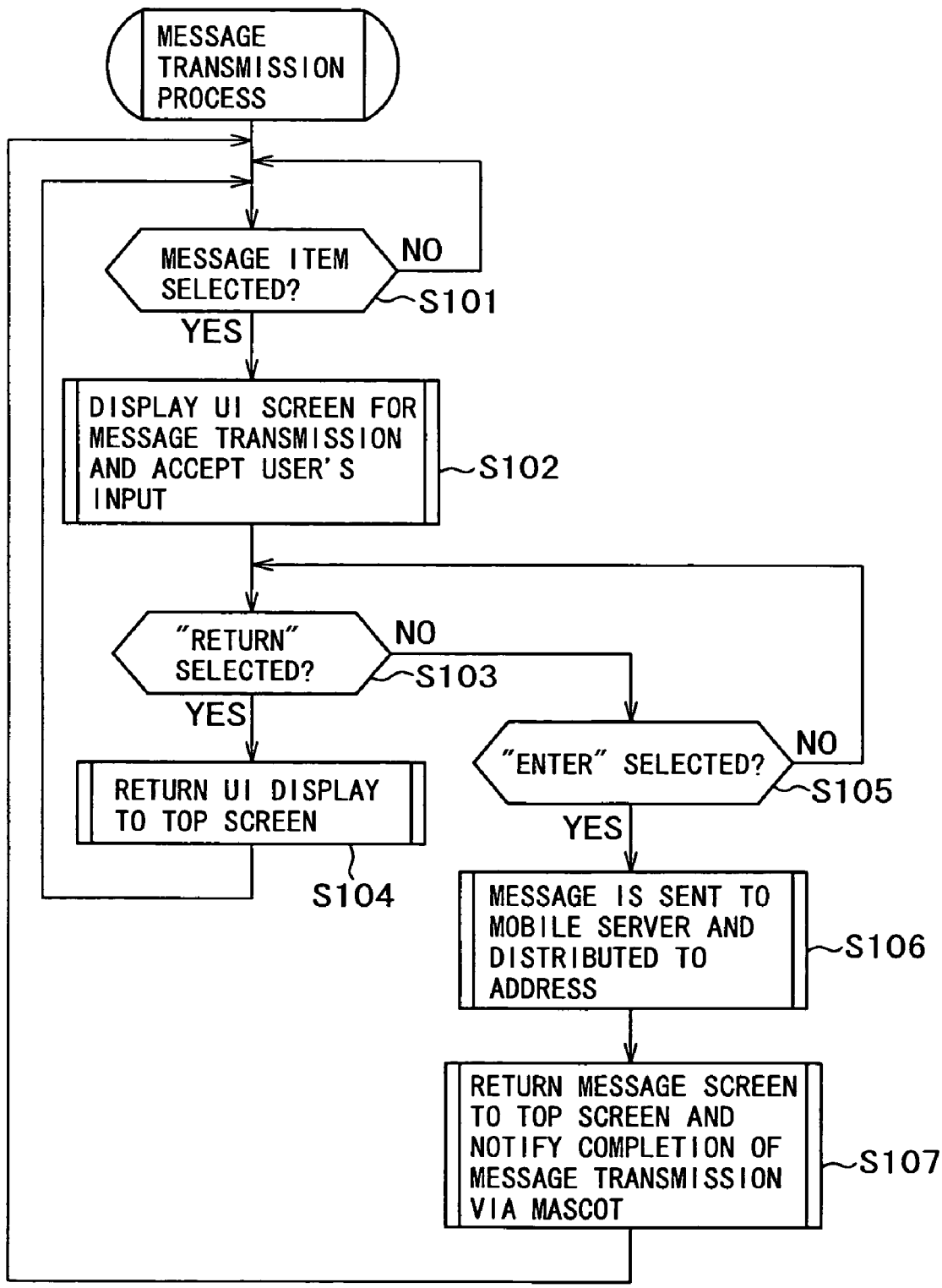
FIG. 22 shows a flow chart showing a message transmission operation of the portable phone device.

Such a message transmission process is performed according to a flow of a flow chart as shown in FIG. 22.

In other words, when the "transmission of message" is selected, as described above, from the selection screen of the "addition to message address list", the "transmission of message", and "reception of message", the CPU of the portable phone device 9 causes the process to go to step S102 via step S101 of the flow chart as shown in FIG. 22.

In step S102 the CPU of the portable phone device 9 controls and displays the input screen of the message as shown in FIG. 21B on the display screen 20, and accepts the input by the user.

The CPU of the portable phone device 9 accepts such an input of the message by the user, while in step S103 it determines whether or not the left soft key 23L has been depressed (whether or not the instructions to "return" have been issued) and determines whether or not the enter button 38 have been depressed (whether or not the instructions to transmit the message have been issued).

When the depression operation of the left soft key 23L is detected, the CPU of the portable phone device 9 returns the display of the display screen 20 to the selection screen in step S104.

On the other hand, when the depression operation of the enter button 38 is detected, the CPU of the portable phone device 9 transmits the message to the mobile server apparatus 11 in step S106, whereby the message is transmitted from the mobile server apparatus 11 to the destination.

When the transmission process of the message is completed, the CPU of the portable phone device 9, in step S107, notifies the user of the completion of the message transmission through the agent.

Here, when transmitting the message, the mobile server apparatus 11 accesses the communications server apparatus 7 so as to search for a device from which the user can receive the message at present.

In other words, as described above, by communicating with each device through each user's domestic network 17, the control server apparatus 5 monitors the operating status of the each device. By always communicating with the control server apparatus 5, the communications server apparatus 7 specifies the device currently operated by the user to be the destination of the message.

For example, when the user as the destination of the message is operating the personal computer apparatus at home, information indicating a startup of the personal computer apparatus is held on the communications server apparatus 7 side. Thus, the mobile server apparatus 11 may access the communications server apparatus 7 so as to recognize that the user to be the destination of the message is operating the personal computer apparatus at home.

After such recognition, the mobile server apparatus 11 transmits the message received from the portable phone device 9 to the personal computer apparatus of the user to be the destination of the message.

In addition, when the personal computer apparatus of the user to be the destination of the message has not started, the mobile server apparatus 11 determines whether or not the user to be the destination of the message has logged in the communication system 2. When it has logged in the communication system 2, the message is transmitted to the user's mobile device.

In this way, the device being used by the user is searched and the message is transmitted to the device in use so that the message may be transmitted to the device with which the user can check the message immediately.

For example, when information such as the image is temporarily stored by means of the information process "hold" as described above, the CPU of the portable phone device 9 displays the letters "place" together with the image 23Rg of the right soft key 23R on the input screen of the message. When detecting the depression operation (place) of the right soft key 23R, the temporarily stored information such as the image is pasted to the message as the attached data.

Figure 23:
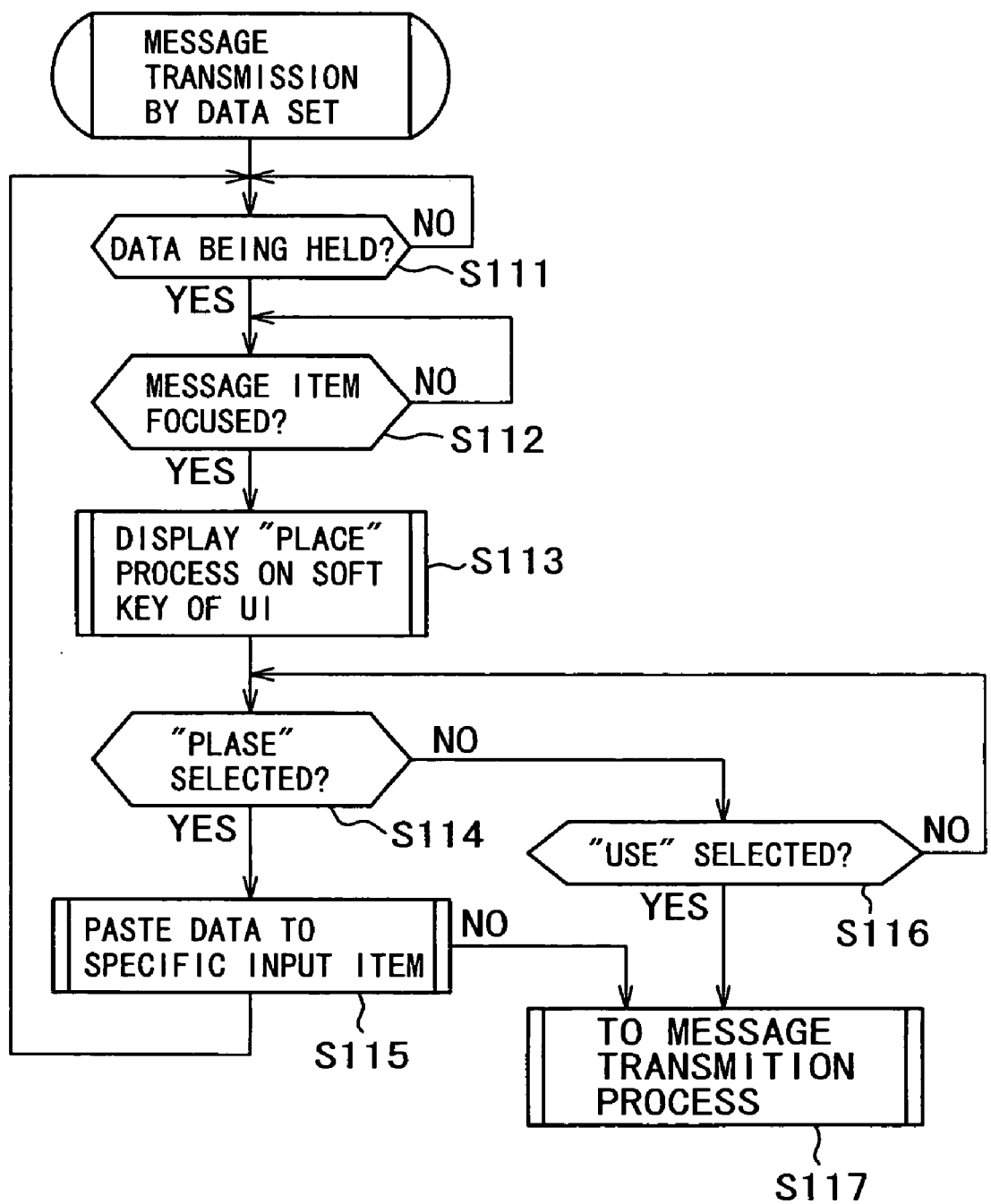
FIG. 23 shows a flow chart showing a flow in which the temporarily stored information is pasted to the message as attachment data.

The paste process is carried out along with a flow as shown in a flow chart of FIG. 23. In particular, for example, when the information such as the image is held, the CPU of the portable phone device 9 causes the process to go to step S112 through step S111. P As described above, as to the initial screen after the initial setup, the image of each of the rooms as shown in FIGS. 8A to 8C is displayed. In step S112 the CPU of the portable phone device 9 determines whether or not the item of the message function 30g has been selected from the items installed in the room and the "transmission of message" has been selected (whether or not the "transmission of message" has been focused as described above). When detecting that the "transmission of message" has been focused as described above, it displays the input screen of the message in step S113, while the image 23Rg of the right soft key 23R and the letters "place" are displayed in the lower domain of the input screen as shown in FIG. 21B, for example.

Next, in step S114 the CPU of the portable phone device 9 determines whether or not the right soft key 23R has been depressed and the instructions to paste (place) the temporarily held information have been issued.

On detecting the depression operation of the right soft key 23R, the CPU of the portable phone device 9, in step S115, pastes the currently and temporarily held information to the message as the attached data, for example. Then, the process moves to step S102 of the flow chart of FIG. 22, and subsequently performs each of the routines of the step S102 to the step S107.

Although not shown in FIG. 21B, when there is the temporarily held information, the CPU of the portable phone device 9 displays, together with the button "place", the button "use" for issuing the instructions to use the temporarily held information. In step S116 of the flow chart of FIG. 23, the CPU of the portable phone device 9 has determined whether or not the instructions to use (use) the temporarily held information have been issued by the user. Thus, upon issue of the instructions to use, in step S117 it moves the process to step S102 of the flow chart of FIG. 22, and carries out each of the routines of the step S102 to the step S107.

[Reception of Message]

Figures 24A, 24B:
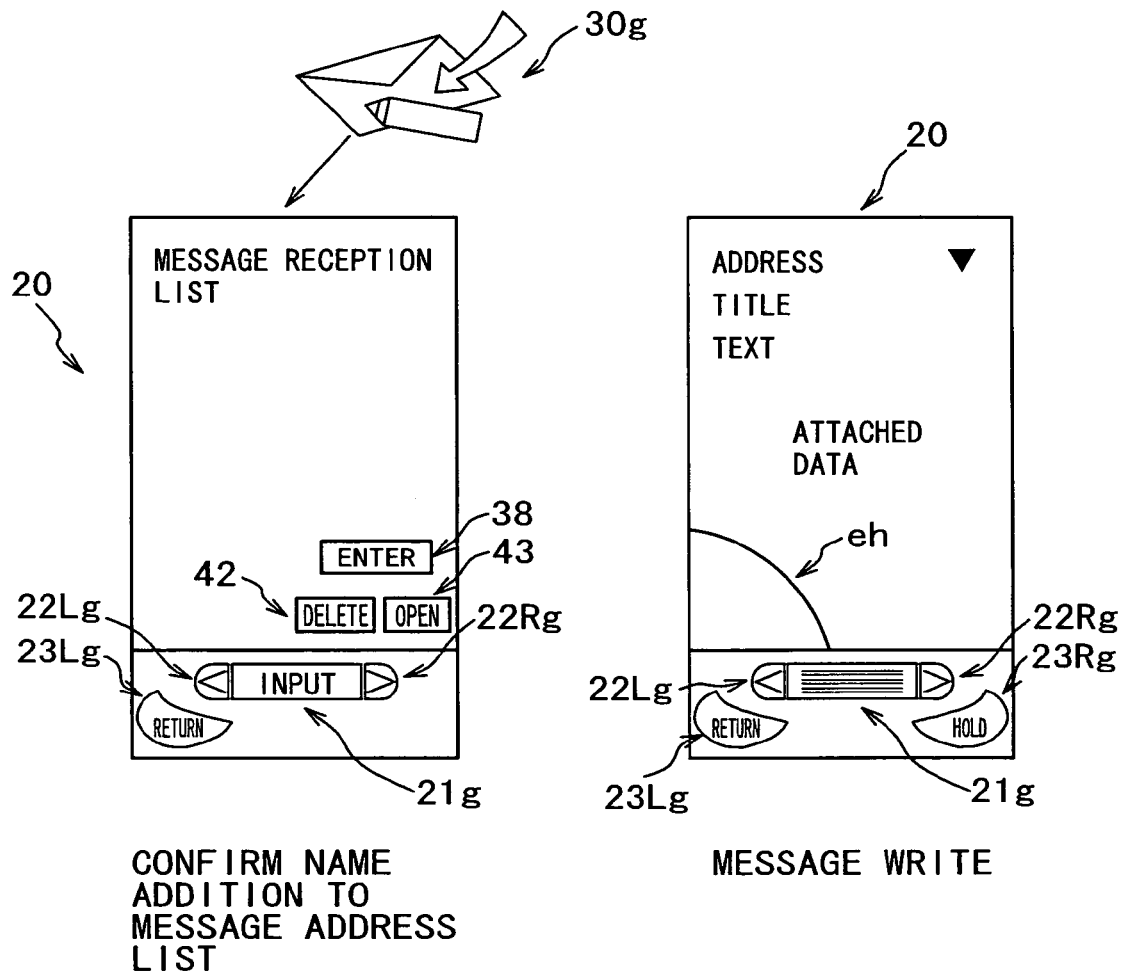
FIGS. 24A and 24B are views showing an example of the display screen of a message reception list and an example of the display screen of the message.

When the "reception of message" is selected from the selection screen, the CPU of the portable phone device 9 accesses the mobile server apparatus 11 so as to take in the message saved in the database 31. As shown in FIG. 24A, the take-in message list (message reception list) is controlled and displayed on the display screen 20.

As to the display screen of the message reception list, the CPU of the portable phone device 9 displays and lists the title of each message taken in from the mobile server apparatus 11, and further displays a delete button 42 for issuing instructions to delete a message and a display button 43 (open) for issuing instructions to display the intake message.

In the lower domain of the display screen, the CPU of the portable phone device 9 controls and displays the letters "input" together with the image 21g of the jog dial 21, and further controls and displays the letter "return" together with the image 23Lg of the left soft key 23L.

On detecting the depression operation of the left soft key 23L (return), the CPU of the portable phone device 9 controls and switches the display screen 20 to the image of the room in which the message function 30g is installed.

On detecting the activation of the delete button 42, the CPU of the portable phone device 9 controls and delete the message selected by the user.

On detecting the activation of the display button 43 (open), the CPU of the portable phone device 9 controls and displays the display screen of the message as shown in FIG. 24B.

[Display of Message]

As the display screen of the message as shown in FIG. 24B, a "sender name", the "title of message", the "text (message)", and the "attached data", if any, are displayed, whereby the user may check a message.

Further, as to the "sender name", when the sender is registered with the message address list, the sender name (nickname etc.) registered with the list is displayed. When the sender is not registered with the message address list, the sender's mail address is displayed.

The letters "return" together with the image 23Lg of the left soft key 23L as well as the letters "hold" together with the image 23Rg of the right soft key 23R are displayed in the lower domain of the display screen of the message.

On detecting the depression operation of the left soft key 23L (return), the CPU of the portable phone device 9 returns the display screen 20 to the display screen of the message reception list as shown in FIG. 24A.

On detecting the depression operation of the right soft key 23R (hold), the CPU of the portable phone device 9 temporarily stores a currently displayed message data. The temporarily stored message data may be used seamlessly among information processes, for example, by pasting it to the scrapbook 30f.

Although the message received by the mobile server apparatus 11 has been described as being obtained by the user; when receiving a message, the mobile server apparatus 11 may notify the user's portable phone device 9 of the arrival of the message.

Figure 25:
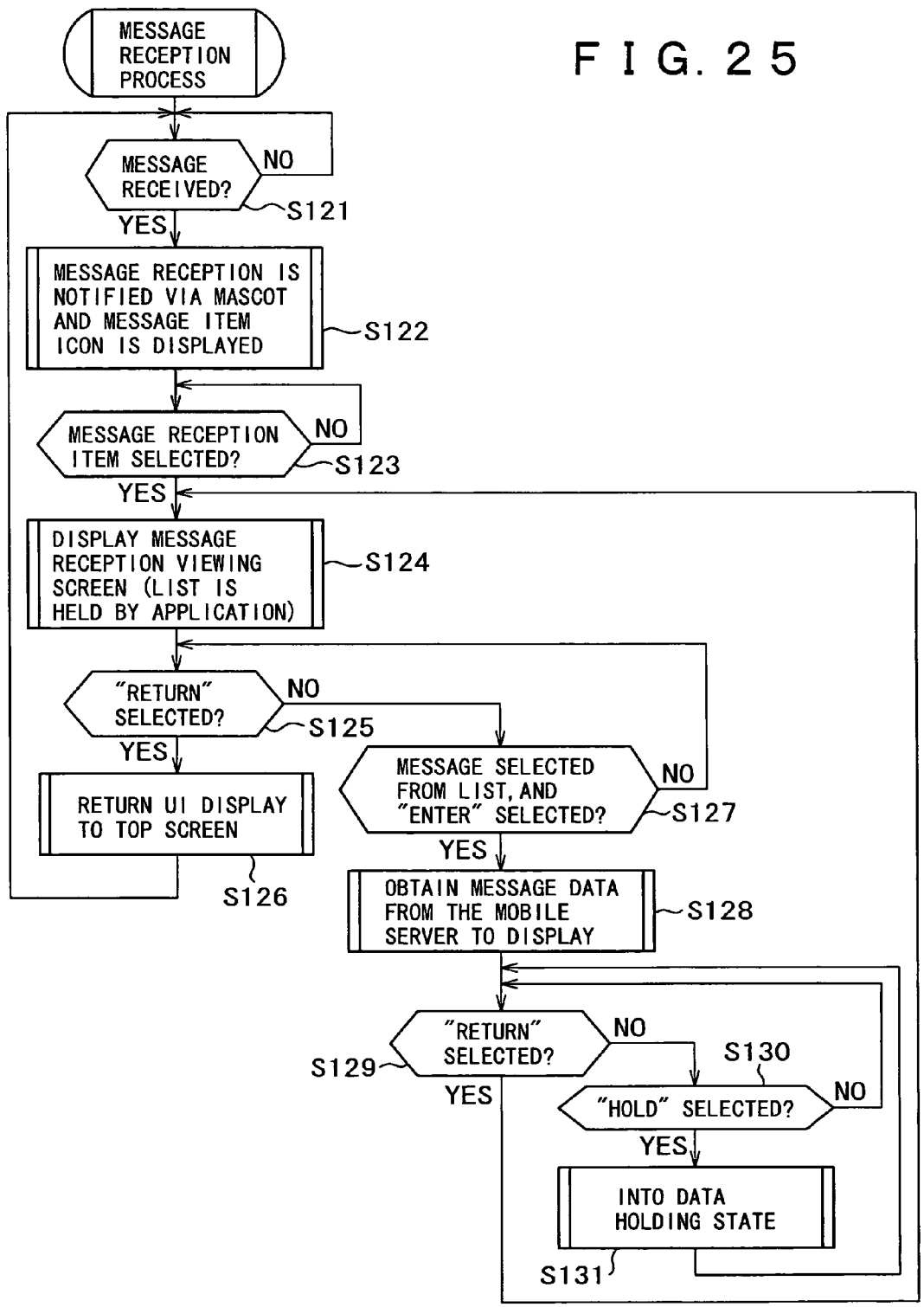
FIG. 25 is a flow chart showing a message reception operation of the portable phone device when a notification of arrival of the message mail is received.

In the flow chart of FIG. 25, there is shown a flow of message reception operation of the portable phone device 9 in case a notification of arrival is received.

In the flow chart the CPU of the portable phone device 9 checks to see if there is a message, based on the notification of arrival of the message from the mobile server apparatus 11, and moves the process to step S122 at the time of detecting the arrival of the message.

In step S122 the CPU of the portable phone device 9 displays the agent on the display screen 20 and further displays, for example, letters "message received", etc. so as to notify the user of the arrival of the message.

Further, the CPU of the portable phone device 9 displays a message reception item 30g as shown in FIG. 24, for example, for the image of the room in which the message function 30g is installed.

In step S123 the CPU of the portable phone device 9 determines whether or not the message reception item 30g has been selected. When the message reception item 30g is selected, in step S124 the message reception list as shown in FIG. 24A is obtained from the mobile server apparatus 11 so as to be controlled and displayed on the display screen 20. The CPU of the portable phone device 9 displays the image 23Lg of the left soft key 23L and the letters "return" and further displays the enter button 38 for issuing instructions to display the selected message on the display screen of the message reception list.

In step S125, on detecting the depression operation (return) of the left soft key 23L, the CPU of the portable phone device 9 returns the display screen 20 to the image of the room in which the message reception item 30g is displayed in step S126.

On the other hand, in step S127, on detecting the activation of the enter button 38, the CPU of the portable phone device 9, in step S128, obtains the message from the mobile server apparatus 11, the message being selected by the user from the message reception list, and displays the message on the display screen 20 as shown in FIG. 24B. Thus, the user may obtain and take a look at the message, based on the notification of arrival.

In addition, when displaying the thus obtained message, the CPU of the portable phone device 9 further displays the letters "return" together with the image 23Lg of the left soft key 23L as well as the letters "hold" together with the image 23Rg of the right soft key 23R, respectively.

In step S129, on detecting the depression operation (return) of the left soft key 23L, the process is returned to step S124 and the message reception list as shown in FIG. 24A is again displayed on the display screen 20.

In step S130, on detecting the depression operation (hold) of the right soft key 23R, the currently displayed message is stored temporarily in step S131. The temporarily stored message data may be pasted to the scrapbook 30f, or pasted to the message to be transmitted, for example, thus being used seamlessly among the information processes.

As is clear from the above description, the information processing system of the preferred embodiment of the present invention may use the data of the electronic program guide, for example, by pasting it to the input screen for performing the reservation setup of the device operated by remote control. It may also be used by pasting to the schedule book, for example, so that one information data may be extended so as to be used seamlessly among the plurality of information processes (among a plurality of systems).

It is often the case that the mobile devices such as the portable phone device 9 are carried by the user. Further, the mobile devices may access a desired site etc. from most places through a network. Such a mobile device can be used as one of the client terminals, and therefore add a new value to the mobile device.

Further, the user may select and install a desired item in a desired room, so that an interface which reproduces the user's room virtually may be provided. Alternatively, by means of customization, an environment suitable for each user may be provided.

Since the user knows the installation location of each item installed in the room of the user's house in which he or she lives everyday life, the user's room may be reproduced virtually, whereby the user may operate the user interface intuitively and easily.

At the beginning of the new system before its widespread use there are few users who are well versed in handling the system, so that it may be difficult for each user to handle the system. The difficulty may preclude the system from spreading, however, the information processing system of the preferred embodiment of the present invention is simply employed as described above, whereby the system becomes popular easily.

Not only the message but also variety of information data such as the information on the electronic program guide, the information on the schedule book, etc. may be employed regardless of each information processing system, which contribute to activation of communications.

In addition, for example, an advertisement may be added to each item, to thereby establish a new business using the system.

Further, it is possible to design freely a constitution etc. of the user interface for each manufacturer to which the user interface is provided. Still further, for example, a specific item may be included in a device operated by remote control so as to attain differentiation among manufacturers.

In addition, the preferred embodiment as described above are examples of the present invention. Therefore, the present invention is not limited to such preferred embodiments, so that many other modifications, variations, combinations and subcombinations of such embodiments and equivalents thereof may be made without departing from the scope and spirit of the present invention.

What is claimed is:

1. An information processing apparatus comprising:
a room image storage means for storing an image of a structure of a room;
an item image storage means for storing an image of an item to be operated in said room;
a portable communication device comprising a display control means for controlling display of a first image on a display means by reading said image of said item selected by a user from said item image storage means while reading said image of said room selected by said user from said image storage means, and forming said first image such that said image of said item is incorporated in said image of said room,
said display control means configured to transmit control information through a mobile server, over the Internet, and to a home network to communicate with said item to be operated in order to operate said item,
wherein the home network is in communication with and provides said control information to one or more devices in said room including said item to be operated, and
wherein the display control means is in communication with said mobile server and said mobile server is configured to obtain device-related information of said one or more devices in said room from internet-connected servers and transmit the device-related information to the portable communication device.

2. The information processing apparatus according to claim 1, further comprising a character image storage means for storing an image of a character, wherein said display control means controls display of a first image on said display means by reading said image of said character selected by said user from said character image storage means, and forming said first image such that said image of said item read through selection by said user and said image of said character read through selection by said user are incorporated in said image of said room selected by said user.

3. The information processing apparatus according to claim 2, wherein said display control means selectively controls by high luminance, display of an outline of a item from a plurality of items incorporated in said first image according to an operation by an operation means.

4. The information processing apparatus according to claim 3, wherein said display control means supplementarily controls display of a function included in said item having the outline thereof displayed by high luminance.

5. The information processing apparatus according to claim 3, wherein said display control means displays said character so as to have said character located in the vicinity of said item having the outline thereof selectively displayed by high luminance.

6. The information processing apparatus according to claim 2, wherein, when an instruction to copy information of a first item to a second item is issued, said display control means controls display of said character in order to pick up a designated object from said first item and place said picked up object on said second item.

7. The information processing apparatus according to claim 6, wherein, when an instruction to copy information of a first item to a second item is issued, said display control means controls display of said character and displays said information of said first item pasted on an input screen of said second item.

8. The information processing apparatus according to claim 1, wherein said display control means is configured to be in communication with the item to be operated through a home network in communication with the Internet.

9. The information processing apparatus according to claim 1, wherein said display control means is configured to be in communication with a control server providing control commands for the item to be operated.

10. An information processing apparatus comprising:
a room image storage configured to store a structure of a room;
an item image storage configured to store an image of an item to be operated in said room;
a portable display device including a display and a display control configured to display a first image on said display device by reading said image of said item selected by a user from said item image storage while reading said image of said room selected by said user from said image storage, and forming said first image such that said image of said item is incorporated in said image of said room,
said display device configured to transmit control information through a mobile server, over the Internet, and to a home network to communicate with said item to be operated in order to operate said item,
wherein the home network is in communication with and provides said control information to one or more devices in said room including said item to be operated, and
wherein the display control means is in communication with said mobile server and said mobile server is configured to obtain device-related information of said one or more devices in said room from internet-connected servers and transmit the device-related information to the portable communication device.

11. The information processing apparatus according to claim 10, further comprising a character image storage configured to store an image of a character, wherein said display control displays a first image on said display by reading said image of said character selected by said user from said character image storage, and forms said first image such that said image of said item read through selection by said user and said image of said character read through selection by said user are incorporated in said image of said room selected by said user.

12. The information processing apparatus according to claim 11, wherein said display control selectively displays an emphasized item from a plurality of items incorporated in said first image.

13. The information processing apparatus according to claim 12, wherein said display control supplementarily displays a function included in said emphasized item.

14. The information processing apparatus according to claim 12, wherein said display control displays said character so as to have said character located in the vicinity of said emphasized item.

15. The information processing apparatus according to claim 11, wherein, when an instruction to copy information of a first item to a second item is issued, said display control displays said character in order to pick up a designated object from said first item and place said picked up object on said second item.

16. The information processing apparatus according to claim 15, wherein, when an instruction to copy information of a first item to a second item is issued, said display control displays said character and said information of said first item pasted on an input screen of said second item.

17. The information processing apparatus according to claim 10, wherein said display control is configured to be in communication with the item to be operated through a home network in communication with the Internet.

18. The information processing apparatus according to claim 10, wherein said display control is configured to be in communication with a control server providing control commands for the item to be operated.

* * * * *